United States Patent [19]

Dokan et al.

[11] Patent Number: 4,742,612

[45] Date of Patent: May 10, 1988

[54] METHOD OF MANUFACTURING WIRE HARNESS BY USING NIPPED CONNECTOR AND APPARATUS THEREFOR

[75] Inventors: Kenjiro Dokan; Seiji Inano; Takashi Onoda; Yuji Fujiwara; Yoshiyuki Hiramatsu; Yoshihiro Umeda; Shinichi Kamo, all of Hamamatsu, Japan

[73] Assignee: Nippon Gakki Seizo Kabushiki Kaisha, Hamamatsu, Japan

[21] Appl. No.: 14,145

[22] Filed: Jan. 30, 1987

Related U.S. Application Data

[63] Continuation of Ser. No. 748,766, Jun. 25, 1985, abandoned.

[30] Foreign Application Priority Data

| | | | |
|---|---|---|---|
| Jun. 27, 1984 | [JP] | Japan | 59-97587[U] |
| Jul. 6, 1984 | [JP] | Japan | 59-141224 |
| Jul. 13, 1984 | [JP] | Japan | 59-106161[U] |
| Jul. 17, 1984 | [JP] | Japan | 59-148744 |
| Jul. 18, 1984 | [JP] | Japan | 59-150361 |
| Jul. 20, 1984 | [JP] | Japan | 59-150936 |
| Aug. 15, 1984 | [JP] | Japan | 59-170758 |
| Aug. 15, 1984 | [JP] | Japan | 59-124893[U] |
| Aug. 15, 1984 | [JP] | Japan | 59-124894[U] |
| Feb. 28, 1985 | [JP] | Japan | 60-40209 |
| Feb. 28, 1985 | [JP] | Japan | 60-29120[U] |
| Feb. 28, 1985 | [JP] | Japan | 60-40211 |

[51] Int. Cl.⁴ .................. B23P 19/00

[52] U.S. Cl. .................. 29/739; 29/564.1; 29/748; 29/760

[58] Field of Search .................. 29/33 F, 33 J, 33 K, 29/33 M, 33 P, 564.1, 564.5, 729, 739, 745, 747, 748, 749, 760, 850, 857, 861, 867, 753, 755; 269/47, 52, 903

[56] References Cited

U.S. PATENT DOCUMENTS

| | | | |
|---|---|---|---|
| 3,258,039 | 6/1966 | Ewalt | 29/755 X |
| 3,417,458 | 12/1968 | Lob et al. | 269/52 X |
| 3,633,096 | 1/1972 | Bollman | 29/755 X |
| 3,842,496 | 10/1974 | Mercer | 29/748 X |
| 4,055,889 | 11/1977 | Fusco et al. | 29/748 X |
| 4,060,890 | 12/1977 | Dechelette et al. | 29/748 X |
| 4,499,648 | 2/1985 | Brown et al. | 29/850 X |
| 4,503,606 | 3/1985 | Honda et al. | 29/739 X |
| 4,598,456 | 7/1986 | McConnell | 29/33 K X |

FOREIGN PATENT DOCUMENTS

| | | | |
|---|---|---|---|
| 3126109 | 1/1983 | Fed. Rep. of Germany | 29/739 |
| 54-282 | 1/1979 | Japan | 29/729 |

*Primary Examiner*—Howard N. Goldberg
*Assistant Examiner*—Joseph M. Gorski
*Attorney, Agent, or Firm*—Blakely, Sokoloff, Taylor & Zafman

[57] ABSTRACT

A method of manufacturing a wire harness with nipped connectors uses a work table having connector holding tools and wiring/nipping tools in a predetermined pattern thereon and a robot with a hand which can be freely moved on the work table. The hand can selectively hold at least a connector holding head for loading connectors in the connector holding tools and a wiring-/nipping head for performing wiring between the connectors to prepare a wire harness.

25 Claims, 35 Drawing Sheets

METHOD OF MANUFACTURING WIRE HARNESS BY USING NIPPED CONNECTOR AND APPARATUS THEREFOR

This is a continuation of application Ser. No. 748,766 filed June 25, 1985, now abandoned.

BACKGROUND OF THE INVENTION

The present invention relates to a method and apparatus for manufacturing a wire harness by using a nipped connector.

Wire harnesses have been widely used in electric appliances including automobiles and electronic musical instruments. A system using a clamped connector has sometimes been used in the manufacture of wire harnesses. However, when a clamped connector is used, an insulation coating must be removed from a wire, a contact must be clamped to catch the wire, and the wire with a contact is inserted in a connector. These manual operations require elaborated and complicated hand works, resulting in time-consuming operations and degrading work efficiency. An auxiliary component, i.e., the contact must be used in addition to the wire.

A nipped connector has been recently used in place of a clamping connector. When a wire is inserted in a connector through an upper opening thereof, a blade of a metal member with a terminal cuts the coating of the wire, and the metal wire is brought into contact with the metal member, thereby electrically connecting the wire to the terminal. In other words, when the wire is simply inserted in the connector under pressure, the wire can be electrically connected to the terminal, so that the connection operation is very simple and other auxiliary components are not required.

Even if a nipped connector is used, however, the manufacture of a wire harness still requires manual operation in the following manner. A wire is looped in a predetermined pattern, bound by binding members at predetermined positions and cut at these positions. Thereafter, connectors are nipped to the wires at the predetermined positions resulting in time-consuming operation and requiring much labor. As a result, the manufacturing operation is cumbersome.

The conventional manual operations are based on batch operations in consideration of efficiency. More particularly, patterning, binding, cutting, nipping and a conduction test of the wire are performed in separate steps. For this reason, when a nipping failure is found in any connector in the conduction test as the final step, the previous operations may often be in vein in accordance with the number and degree of nipping errors. The conventional batch operations cannot always prevent such operation loss. In addition, the manual operation is performed in accordance with control of fitters. Operation errors occur due to unskilledness, mistakes and exhaustion of the fitters. In particular, such operation errors tend to occur in patterning, cutting and nipping of the wire. Once an operation error occurs, the prepared wire harness cannot be used.

In general, since various types of wire harnesses are manufactured each in a small volume, model change often occurs. Along with this, wire patterns are frequently updated. Further operation errors thus often occur.

An automatic nipper has already been known to resolve the above problems. A plurality of wires are fed parallel to each other to parallel connectors and are automatically inserted by nipping punches in the corresponding connectors. In this automatic nipper, since the wires must be fed parallel to each other, the types of wire harnesses which can be manufactured are limited. For example, a wire harness having a structure wherein wires cross and are connected to arbitrarily selected terminals of the connector cannot be manufactured.

SUMMARY OF THE INVENTION

It is, therefore, an object of the present invention to provide a method and apparatus for manufacturing a wire harness by using a nipped connector without requiring manual operation.

It is another object of the present invention to provide a method and apparatus for manufacturing a wire harness by using a nipped connector, wherein a layout of a wiring/nipping tool can be relatively simply modified.

It is still another object of the present invention to provide a method and apparatus for manufacturing a wire harness by using a nipped connector, wherein the manufacturing operation can be automated and simplified to greatly improve operation efficiency.

It is still another object of the present invention to provide a method and apparatus for manufacturing a wire harness, wherein operation loss inherent in conventional manual batch operations can be greatly decreased.

It is still another object of the present invention to provide a method and apparatus for manufacturing a wire harness by using a nipped connector, wherein operation errors can be eliminated and the wire harness can be manufactured with high precision.

According to an aspect of the present invention, there is provided a method of manufacturing a wire harness by using a nipped connector in an apparatus having a work table with a plurality of connector holding tools and wiring/nipping tools thereon in a predetermined pattern, a robot having a hand which can be moved in back-and-forth, vertical and horizontal directions, a connector setting head selectively picked up by the hand for setting a plurality of nipped connectors in the connector holding tools on the work table, and a wiring/nipping head which is selectively held by the hand so as to perform wiring between the nipped connectors, characterized in that the connector setting head is moved by the hand to sequentially set the nipped connectors supplied from a connector supply source in the connector holding tools at predetermined positions on the work table; and the wiring/nipping head is moved by the hand to sequentially nip wires supplied from a wire supply source in a predetermined order, thereby manufacturing a predetermined wire harness.

According to another aspect of the present invention, there is provided an apparatus for manufacturing a wire harness by using a nipped connector, characterized in that said apparatus comprises: a work table having a plurality of connector holding tools and wiring/nipping tools thereon in a predetermined pattern; a robot having a hand which can be moved in back-and-forth, vertical and horizontal directions; a connector setting head selectively picked up by the hand for setting a plurality of nipped connectors in the connector holding tools on the work table; a wiring/nipping head which is selectively held by the hand so as to perform wiring between the nipped connectors; a connector supply source for supplying the nipped connectors to the connector setting head; a wire supply source for supplying wires to the wiring/nipping head; and a control device for sequentially controlling the work table, the robot, the connector setting head, the wiring/nipping head, the connector supply source and the wire supply source.

DESCRIPTION OF THE PREFERRED EMBODIMENTS

Figure 1:
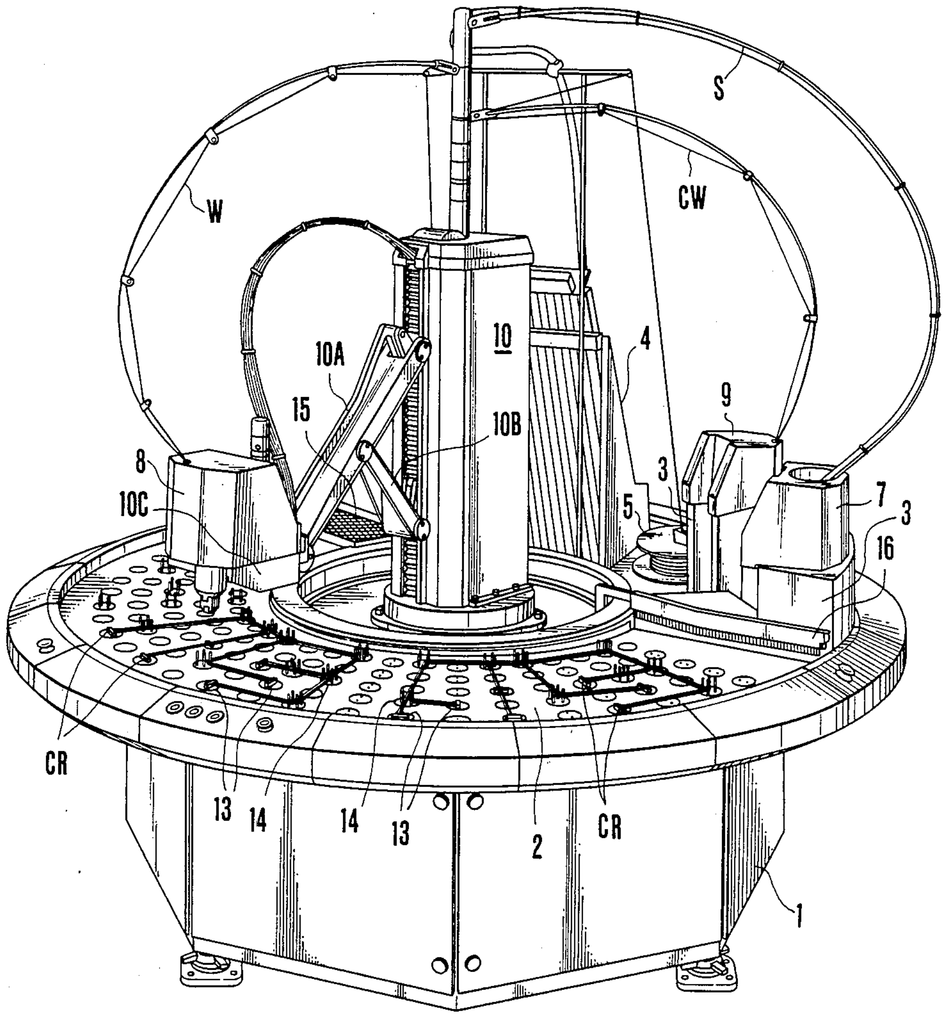
FIG. 1 is a perspective view showing the overall system configuration of an apparatus using a method of manufacturing a wire harness by using a nipped connector according to an embodiment of the present invention.

FIG. 1 shows the overall system configuration of an apparatus for manufacturing a wire harness by using a nipped connector according to the present invention. Referring to FIG. 1, an arcuated wiring table 2 is horizontally placed on a base 1. A column-like control unit 10 extends at the center of the base 1. Three work head housing units 3 are mounted on the table such nonoperative work heads are temporarily placed on the corresponding units 3 in a region outside the wiring region. A connector setting head 7, a wiring/nipping head 8 and a binding head 9 are placed on each work head housing unit 3 from the side of the wiring table 2. The control unit 10 is vertically moved by a motor driven under the control of a computer and has an arm 10A radially extended in cooperation with a subarm 10B. A hand 10C is mounted at the distal end of the arm 10A. Each work head is automatically moved along the radial, circumferential and vertical directions upon radial direction of the arm 10A, rotation of the control unit 10 and the vertical movement of the arm 10A. Therefore, the control unit 10 serves as a robot having the arm 10A and the subarm 10B which can be moved along the radial, circumferential and vertical directions. The connector setting head 7 (to be described in detail with reference to FIGS. 9 to 17) sequentially sets nipped connectors CR which are automatically supplied from a connector feeder 4 through a feed pipe or chute S. The connector feeder 4 (to be described in detail with reference to FIGS. 25 to 28) sequentially selects the connector CR used for a wire harness during manufacture among magazines obliquely aligned in line. Therefore, the connectors are fed one by one through the chute S to the connector setting head 7.

A binding material feed unit 5 and a wire feed unit 6 are arranged around the robot 10.

The wiring/nipping head 8 (to be described in detail later with reference to FIGS. 18 to 24) feeds wires W from the wire feed unit 6 to the respective nipped connectors CR held on the wiring table 2. The binding head 9 binds a plurality of wires on the wiring table 2 by means of a binding wire CW. In order to prepare a wire harness, the hand 10C causes the connector setting head 7 to sequentially set nipped connectors CR supplied from the connector feeder 4 through the chute S in connector holding tools 13 on the wiring table 2. The hand 10C moves the connector setting head 7 to the work head housing unit 3 and then picks up the wiring/nipping head 8. The wire is nipped in the nipped connector CR in the connector holding tool 13 so as to perform wiring while the wire is hooked by a wiring/nipping tool 14. The hand 10C moves the wiring/nipping head 8 back to the work head housing unit 3 and then picks up the binding head 9 which then binds the wires W at predetermined positions, thereby preparing a wire harness with nipped connectors. A control device is housed in the base 1 below the wiring table 2 to control constituting components including the control unit 10.

According to the present invention, all sequences are automated by using the robot, thus simplifying the operation and achieving high-speed operation within the limits of the mechanism. As a result, the operation efficiency can be greatly improved.

Since all the sequences in the present invention are performed under the control of computer, no manual errors occur.

Referring to FIG. 1, a harness delivery arm 16 is arranged at the right end of the wiring table 2 to guide the prepared wire harness on the wiring table 2 to a delivery conveyor 15 located at the left end of the wiring table 2. The harness delivery arm 16 is moved on the wiring table 2 in an arcuated shape to guide the prepared wire harness to the delivery conveyor 15.

Figure 2:
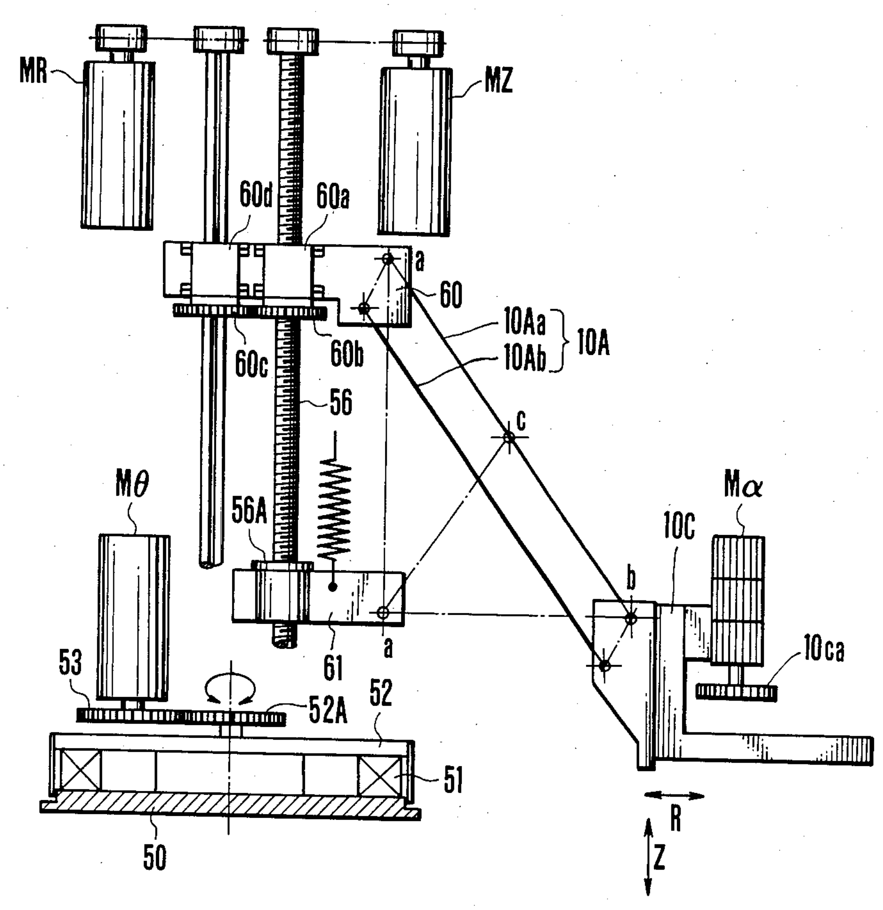
FIG. 2 is a diagram showing the basic configuration of a control unit serving as a robot of FIG. 1.

The control unit 10 located at the center of the arc of the wiring table 2 comprises a cylindrical coordinate type robot whose structure is schematically illustrated in FIG. 2. The unit 10 is turned horizontally about the vertical axis (to be referred to $\theta$-axis direction hereinafter) by a motor M$\theta$ under the control of a computer incorporated therein. The hand 10C is mounted at the distal end of the arm 10A extending from the front surface of the robot 10. The arm 10A is driven by a motor MR in the robot 10 and is moved to cause the hand 10C to move along the circumferential direction (to be referred to as an R-axis direction hereinafter) and driven by a motor MZ along the vertical direction (to be referred to as a Z-axis direction hereinafter).

A motor M$\alpha$ (FIG. 7) is mounted in the hand 10C in the robot 10 to rotate the hand.

More particularly, in the robot 10, a rotational table 52 is mounted on a base 50 through a turning bearing 51. The $\theta$-axis servo motor M$\theta$ is mounted on the rotational table 52 through gears 52 and 53. A ball spline 57 and a ball screw 56 are mounted on the rotational table 52 to be parallel with each other. The ball spline 57 and the ball screw 56 extend through upper and lower blocks 60 and 61. A nut 56A of the ball screw 56 is directly fixed at the lower block 61. When the ball screw 56 is rotated, the lower block 61 is vertically moved.

A nut 60*a* threadably engaged with the ball screw 56 is not directly fixed to the upper block 60 but is rotatably supported through a bearing. The nut 60*a* is coupled through a gear 60*c* to a nut 60*d* of the ball spline 57 running parallel to the ball screw 56. The gear 60*c* is meshed with a gear 60*b* integrally mounted with the nut 60*a*. The nut 60*d* is rotatably supported by a bearing in the same manner as the nut 60*a*.

The Z-axis servo motor MZ and the R-axis servo motor MR are coupled to ends of the ball screw 56 and the ball spline 57. When the R-axis servo motor MR is driven, the spline 57 is rotated. The nut 60*a* of the upper block 60 is rotated through the nut 60*d* and the gears 60*c* and 60*b*. In this case, when the ball screw 56 is stopped by the Z-axis servo motoı MZ, only the upper block 60 is vertically moved. As a result, the hand 10C is moved along the R-axis direction.

However, when the R-axis servo motor MR is stopped, the nut 60*a* of the ball screw 56 in the upper block 60 is kept in a state as if it were fixed to the upper block 60. When the ball screw 56 is rotated by the Z-axis servo motor MZ, the upper and lower blocks 60 and 61 are vertically moved while they are spaced by a predetermined distance from each other. As a result, the hand 10C is moved along only the Z-axis direction. In this manner, by combining the ball screw 56 and the ball spline 57, the hand 10C can be linearly moved along the R- and Z-axis directions.

The above mechanism is placed on the rotational table 52 as a whole. The $\theta$-axis servo motor M$\theta$ mounted on the rotational table 52 performs $\theta$-axis driving.

Figure 3:
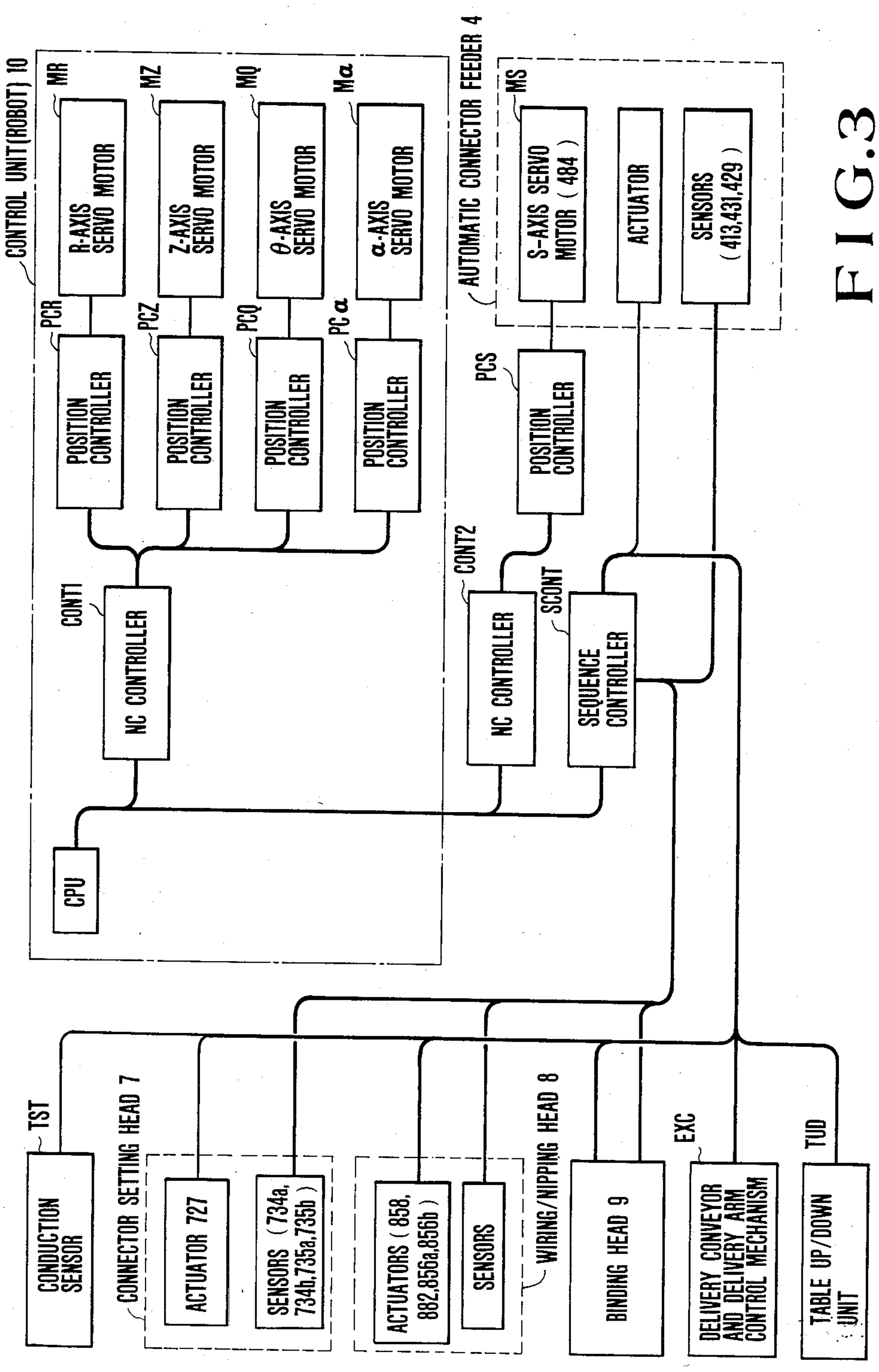
FIG. 3 is a block diagram of a control system of the apparatus shown in FIG. 1.

FIG. 3 shows the basic arrangement of the control system of the control device including the control unit 10 as the robot. Referring to FIG. 3, the motors MR, MZ, M$\theta$ and M$\alpha$ are controlled by position controllers PCR, PCZ, PC$\theta$ and PC$\alpha$ and an NC controller CONT1 under the control of a central processing unit CPU in accordance with a known program. The contents of the program can be readily understood in accordance with the following description for the respective mechanisms to be described later.

Under the control of the central processing unit CPU, an NC controller CONT2 and a sequence controller SCONT are operated in addition to the NC controller CONT1. The NC controller CONT2 controls an S-axis servo motor MS of the automatic connector feeder 4 through a position controller PCS. The sequence controller SCONT drives actuators of the components 4, 7, 8 and 9 under the control of the central processing unit CPU in accordance with data supplied from sensors from the components 4, 7, 8 and 9. The sequence controller SCONT is connected to a conduction sensor TST for testing whether or not the connector terminals ar electrically connected to the wires (to be described with reference to FIGS. 4 to 8) when the wires are connected to the nipped connectors. The sequence controller SCONT is connected to a control mechanism EXC for controlling the delivery conveyor 15 and the delivery arm 16. When wiring is completed on the wiring table 2 and a wire harness is prepared, the prepared harness is guided by the delivery arm 16 to the delivery conveyor 15, thereby deliverying the harness out of the system. The sequence controller SCONT is also connected to a table up/down unit for vertically moving the wiring table 2 during connector setting operation, wiring/nipping operation and binding operation. The operations of the above-mentioned components will be readily understood in accordance with the mechanisms of the respective parts and their operations.

With the above arrangement, the program can be updated by only changing a program for executing the control sequences of the controllers CONT1, CONT2, SCONT and NC control. Therefore, when a program is read from an external memory, the system itself need not be modified even if the operation contents are greatly changed. Therefore, such a system is suitable for production of various types of harnesses each in a small volume.

Figure 4:
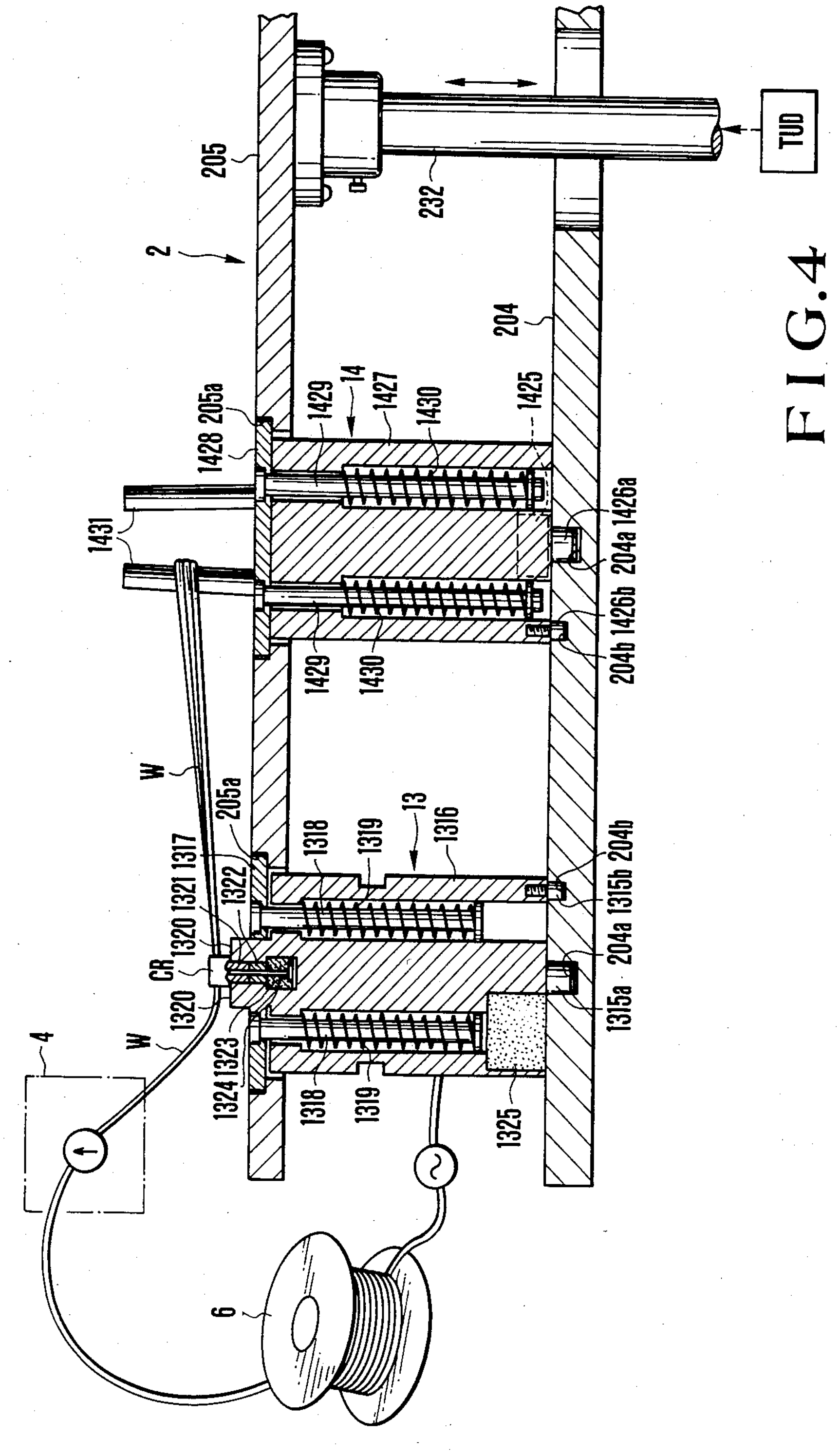
FIG. 4 is a sectional view for explaining the operations of a connector holding tool and a wiring/nipping tool arranged on a work table.

As shown in FIG. 4 the wiring table 2 comprises a fixed plate 204 fixed on the base 1, and a movable plate 205 which is supported by a plurality of support rods located above the fixed plate 204 and which is vertically movable. The vertical movement of the movable plate 205 is controlled by the table up/down unit TUD (not shown in FIG. 4) arranged below a component 232. The plurality of connector holding tools 13 and the plurality of wiring/nipping tools 14 are located at equal intervals on the fixed plate 204. Projections 1315*a* and 1426*a* at the centers of the lower surfaces of the tools 13 and 14 are engaged with recesses 204*a* arranged in a predetermined pattern on the upper surface of the fixed plate 204. In other words, the connector holding tools 13 and the wiring/nipping tools 14 are located at the predetermined positions for determining the wiring pattern of the wire harness. Recesses 204*b* (one of which is not illustrated) are formed near the recess 204*a* to correspond to projections 1315*b* and 1426*b* formed at the peripheral portion between the connector holding tool 13 and the wiring/nipping tool 14. An angle formed by each of lines connecting the recesses 204*b*, 204*a* and 204*b* is given as 90°. The projection 1315*b* is selectively inserted in the recess 204*b* or 204*c*, so that the directivity of the connector holding tool 13 is determined.

Figure 5:
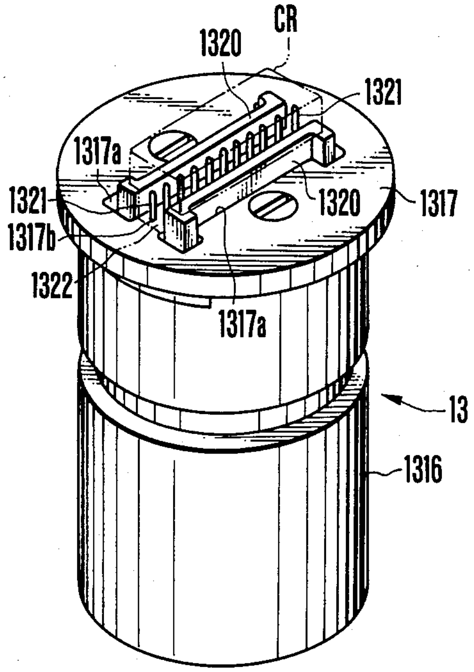
FIG. 5 is a perspective view of the connector holding tool shown in FIG. 4.
Figure 6:
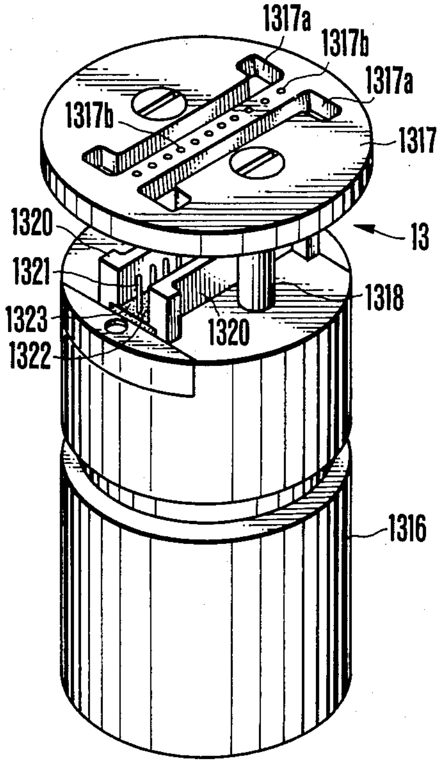
FIG. 6 is a perspective view showing the connector holding tool while a delivery board is moved upward in FIG. 5.

As shown in FIGS. 5 and 6, the connector holding tool 13 comprises a columnar tool body 1316 made of a conductive material, a disk-like delivery plate 1317 mounted on the upper surface of the body 1316, and two pins 1318 each having one end which is inserted in a longitudinal hole of the body 1316 and which is mounted on the delivery plate 1317. The delivery plate 1317 can be moved upward under the control of the table up/down unit TUD and is always biased upward by compression coil springs 1319 arranged around the pins 1318. A pair of connector holders 1320 extend upward from the center of the upper surface of the tool. The connector holders 1320 extend through through holes 1317*a* formed in the delivery plate 1317, respectively. Conductive connector holding pins 1321 are aligned between the connector holders 1320 so as to connect to a pin insertion port of the nipped connector CR. As shown in FIG. 4, the lower end portion of the connector holding pin 1321 is embedded in an insulating member 1323 disposed at the bottom of a recess 1322 formed between the connector holders 1320 and is vertically supported. The upper end of the pin 1321 extends through a hole 1317*b* located between the through holes 1317*a* in the delivery plate 1317. A conductive rubber member 1324 constituting the conduction sensor TST is placed under the lower end of the connector holding pin 1321 in the recess along the longitudinal direction thereof. The insulating member 1323 is urged by the delivery plate 1317. When the biasing force acts on the conductive rubber member 1324, the member 1324 is rendered conductive, so that the connector holding pin 1321 is electrically connected to the tool body 1316.

The nipped connector CR (to be described in detail later with reference to FIG. 9) is inserted by the connector setting head 7 between the connector holders 1320, the plurality of connector holding pins 1321 inserted in the insertion port of the nipped connector CR are in contact with the contacts of the nipped connector CR, so that the nipped connector CR can be detachably held by the pins 1321. When the wire W is nipped by the wiring/nipping head 8 into the nipped connector CR, the urging force acts on the delivery plate 1317 which is then moved downward. The conductive rubber member 1324 is rendered conductive, as described above. As shown in FIG. 4, the wire W is electrically connected to the tool body 1316 through the conduction sensor TST of the control unit 10. When the wires W are in contact with the contacts of the body 1316, a closed circuit is formed through the control unit 10. The wire nipping can be checked by the control unit 10 every time the wire is nipped in the nipped connector CR. When a failure is detected, wiring by the wiring/nipping head 8 is stopped.

As described above, since the test is performed every time the wire is nipped in the connector, unlike the conventional batch operations, wiring, binding, cutting, nipping and conduction test need not be separately performed. Therefore, unlike the conventional batch operations wherein the wire harness is wasted when a connection error is found during the test, all the conventional problems can be solved. Reference numeral 1325 denotes a permanent magnet embedded at the lower portion of the tool body 1316. When the permanent magnet 1325 is attracted to the fixed plate 204, the connector holding tool 13 can be firmly held.

Figure 7:
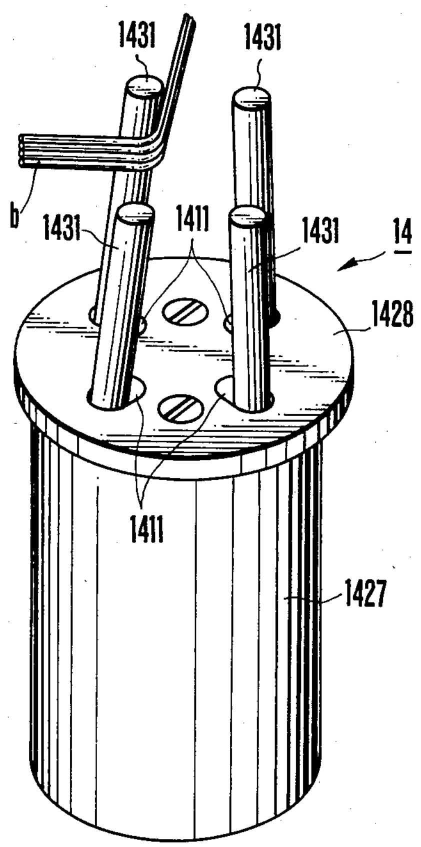
FIG. 7 is a perspective view of the wiring/nipping tool shown in FIG. 4.

As shown in FIGS. 4 and 7, the wiring/nipping tool 14 comprises a columnar tool body 1427, a delivery plate 1428 mounted on the upper surface of the tool body 1427, and two pins 1429 which are mounted in a longitudinal hole formed in the tool body 1427 and each of which has one end connected to the delivery plate 1428. The delivery plate 1428 can be moved upward and is always biased downward by compression coil springs 1430 arranged around the pins 1429. Four pins 1431 extend upward from the upper surface of the tool body and extend through elongated holes 1411 formed in the delivery plate 1428 along directions perpendicular to each other. Therefore, the pins 1431 are located along the directions perpendicular to each other with respect to the center of the tool body. The two adjacent pins have a gap so as to cause the wiring/nipping head 8 to pass therethrough. The wiring/nipping head 8 changes its moving direction at the center of the tool body and passes a gap between the pins 1431. The pins 1431 are inclined toward the center of the tool body so as to prevent the wire from being removed when the wire W is hooked thereon. A permanent magnet 1425 is embedded at the lower end portion of the tool body 1427 in the wiring/nipping tool 14, so that the tool 14 can be firmly fixed on the fixed plate 204.

Figure 8:
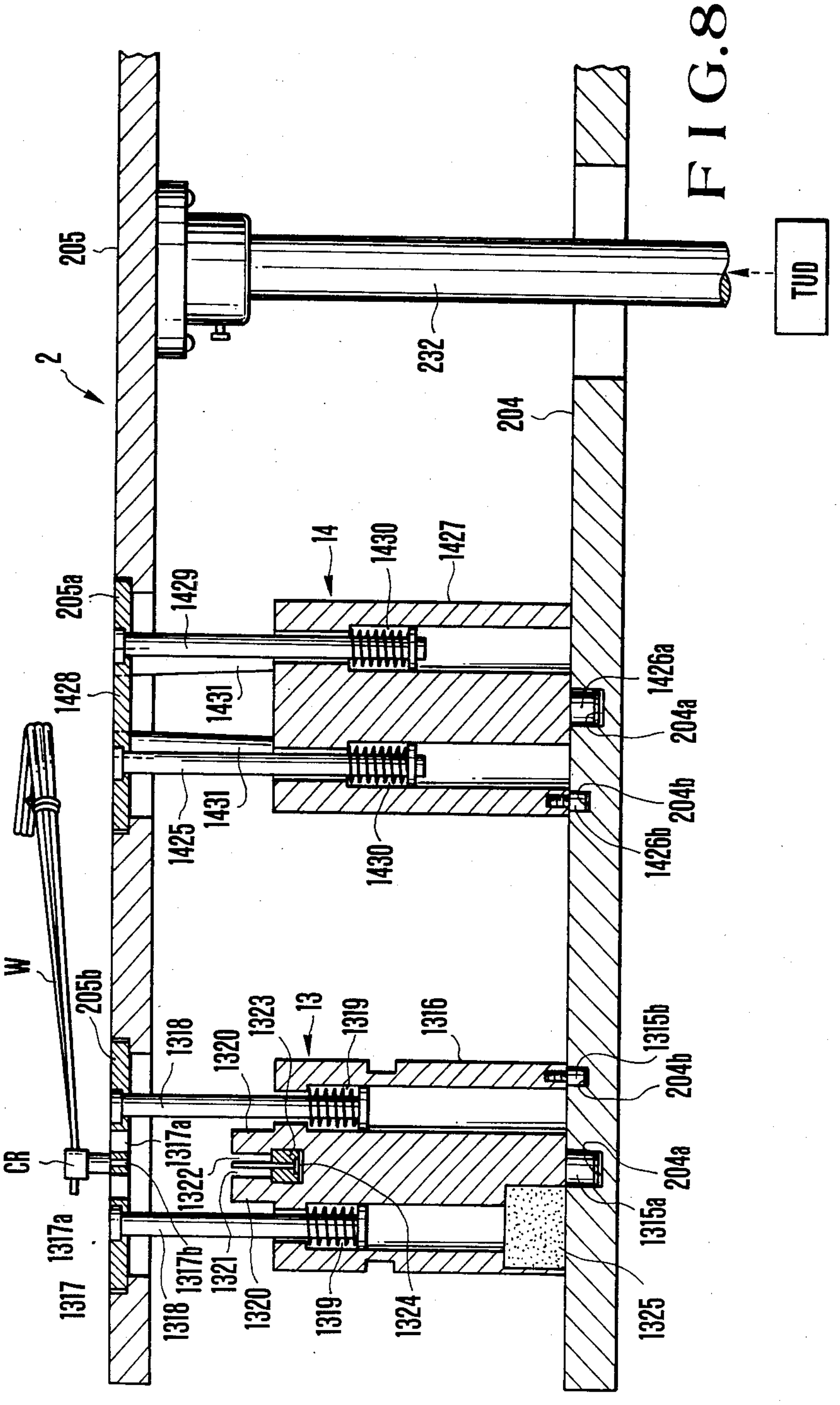
FIG. 8 is a sectional view for explaining the removal of the prepared wire harness.

A plurality of through holes 205*a* are formed in the movable plate 205. The through holes 205*a* correspond to the recesses 204*a* formed in the fixed plate 204, respectively, so that the connector holding tool 13 or the wiring/nipping tool 14 can be inserted and fixed on the fixed plate 204. The inner edge of the through hole 205*a* is formed in a stepwise manner, so that the delivery plates 1317 and 1428 of the tools 13 and 14 are stopped by the step of each hole 205*a*. As shown in FIGS. 4 and 8, the movable plate 205 is supported by a plurality of support rods 232 to transmit rotation of a motor as the table up/down unit TUD fixed on the bottom plate of the base 1 to a plurality of rack-pinion mechanisms (not shown), thereby vertically moving the support rods 232 extending through the fixed plate 204. Therefore, the movable plate 205 can be vertically moved. After the wires are nipped and bound on the wiring table 2 (during binding operation, the position of the movable plate 205 is lower than that shown in FIG. 4), the movable plate 205 located such that the delivery plates 1317 and 1428 are moved upward until the pins 1431 are located below the delivery plate 1428. As shown in FIG. 7, the prepared wire harness with nipped connector is removed from the corresponding tool. The delivery arm 16 of FIG. 1 is driven under the control of the control mechanism EXC to guide the wire harness from the table 2 to the delivery conveyor 15 and remove it outside the table 2.

With the table structure described above, the subsequent operations, i.e., holding of the connector CR by the connector setting head, the wiring/nipping head 8 and the binding head 9 which are selectively held by the hand 10C, patterning of the wire, and wire binding can be performed without manual operations. In addition, the conduction test is performed every time the wire is nipped. Unlike the conventional batch operation wherein the conduction test is the final step so that the prepared harness is wasted if connection errors are found, the wire harness with nipped connectors can be easily manufactured at low cost.

The wires are hooked around the pins when the wires are fed from the wiring/nipping head passing above the wiring/nipping tool, so that the plurality of wires can be bound between the wiring/nipping tool and the connector holding tool, thereby effectively binding the wires. In addition, the wires can be simultaneously removed upon upper movement of the delivery plate, thereby obtaining an effective apparatus for manufacturing a harness by using nipped connectors.

In the above embodiment, the four pins 1431 are arranged in the wiring/nipping tool 14 along directions perpendicular to each other. The pins 1431 are located at equal distances from the center of the tool, so that the wiring head can be changed in a direction perpendicular to the previous direction at the center (reference point) of the tool.

Direction changing of different wires is performed by the corresponding pins. Even if the wires are bound, a force acting on the pin is not increased. Therefore, when the wire harness is prepared, it can be easily removed.

Figure 9:
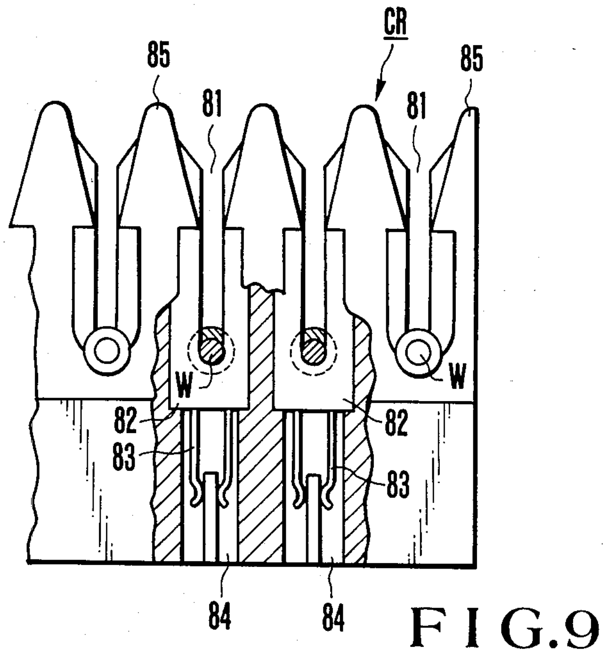
FIG. 9 is a partially cutaway side view showing a nipped connector used in the present invention.
Figure 10:
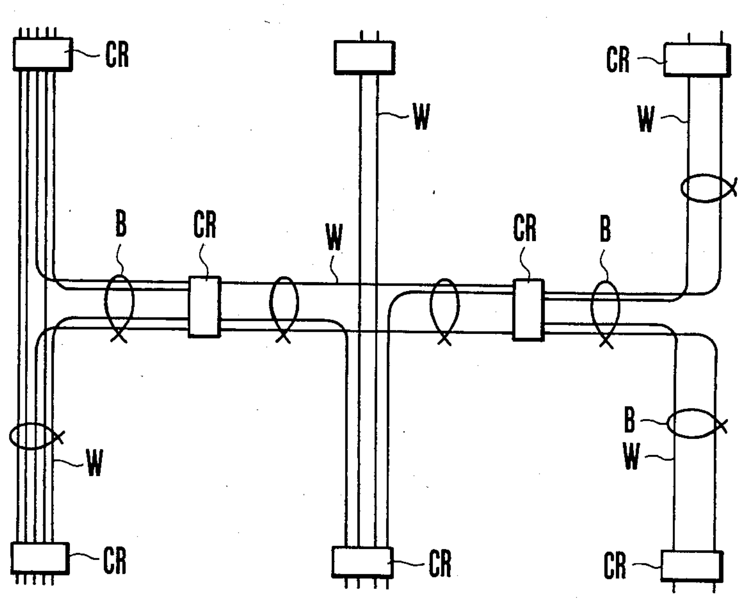
FIG. 10 is a plan view showing a wire harness prepared according to the present invention.

FIGS. 9 and 10 show the connector CR used during the manufacture of the wire harness and the prepared wire harness, respectively. The connector CR shown in FIG. 9 comprises a hard synthetic resin. The connector CR has insertion ports 81 for the wires W on its upper surface. The connector CR also has metal members 82 each having a V-shaped blade exposed at the bottom of the insertion port 81. The distal end of each terminal 83 extending downward from the corresponding metal member 82 is exposed in a base pin insertion hole 84 at the bottom of the printed circuit board. Referring to FIG. 4, the pins 1321 are respectively inserted in the holes 84. Each guide member 85 extending upward has an inclined structure so as to guide the wire W. Therefore, when each wire W is inserted from the upper portion in the corresponding insertion port 81, the coating of this wire W is removed by the metal member 82, so that the wire itself is in contact with the metal member 82. When the connector CR is mounted on the printed circuit board, the corresponding terminal 83 in the insertion hole 84 is in contact with the corresponding base pin, thereby connecting the wire W to the corresponding line of the printed circuit board.

Figure 11:
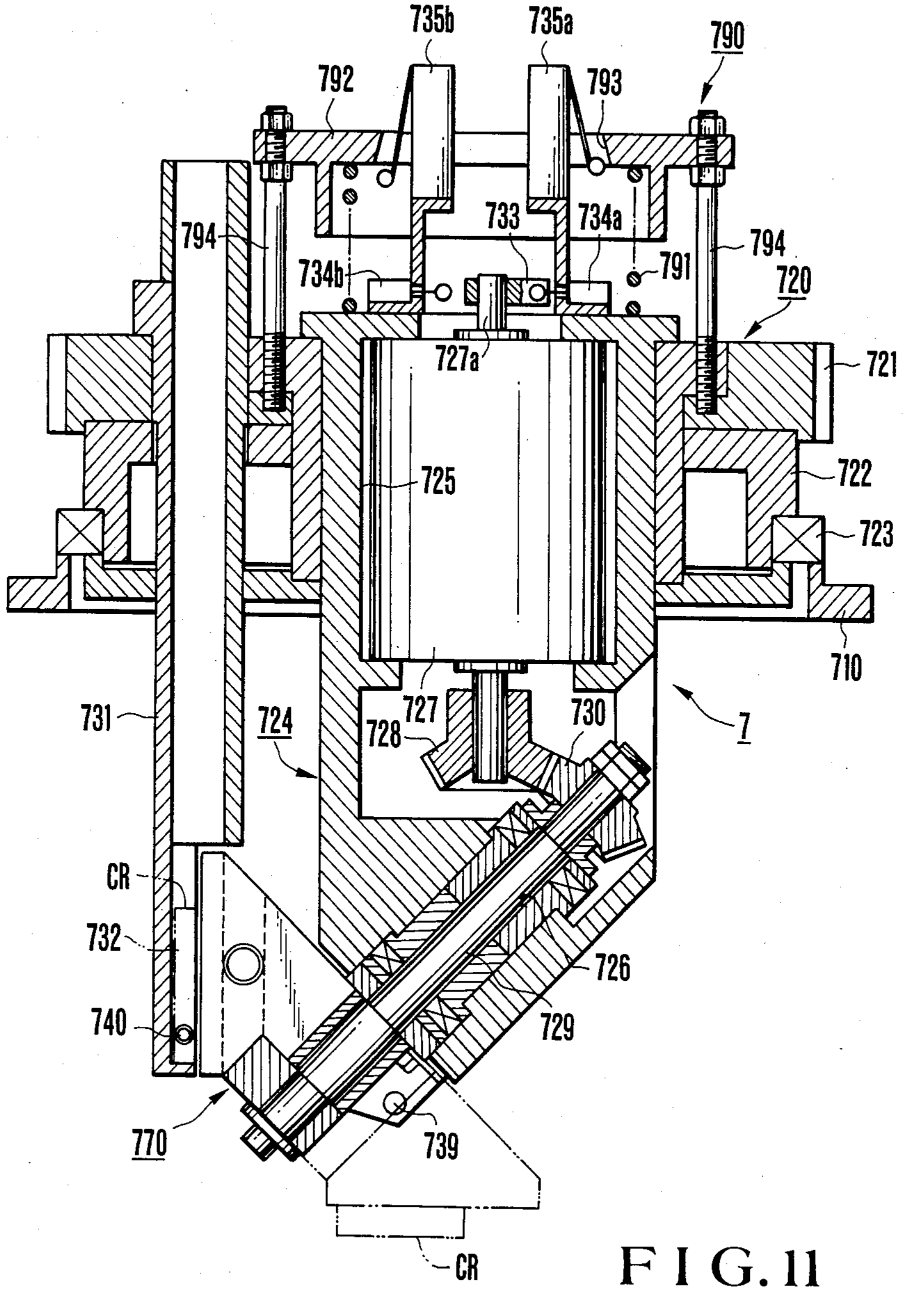
FIG. 11 is a sectional view showing a connector setting head (FIG. 1) whose cover is removed.
Figure 12:
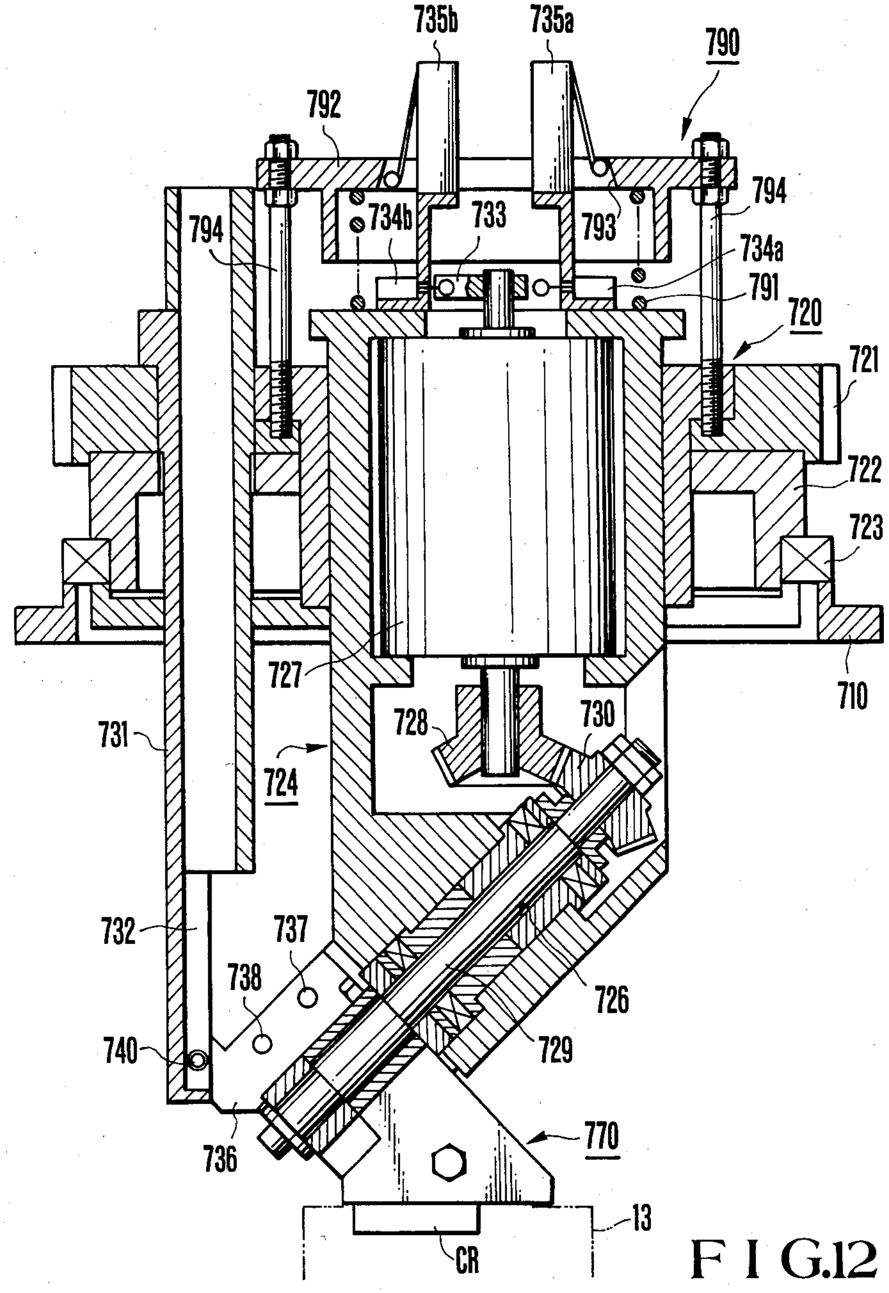
FIG. 12 is a sectional view showing a state wherein the connector setting head sets the nipped connector in position.

FIGS. 11 to 16 show detailed constructions of the connector setting head 7 used in the above embodiment. FIG. 12 shows a state wherein the connector is held by the tool. Referring to FIGS. 11 to 16, the connector setting tool 7 mainly comprises a base plate 710 engaged with the robot hand, a main body 720 supported by the base plate 710 and horizontally rotatable, a clamp unit 770 supported below the main body 720 and pivotal about an inclined shaft through 180° , and an upper structure 590 connected to the main body 720.

The main body 720 has a circular shape as a whole. A gear 721 and a cylindrical plate 722 rotated together with the gear 721 are placed on the main body 720 through a bearing 723. The gear 721 is meshed with a drive gear 10C*a* incorporated in the hand 10C of the robot 10. When the gear incorporated in the robot hand is rotated, the main body 720 is rotated about the central axis.

The main body 720 comprises a housing block 724 which is coaxially rotated together with the main body 720 and which is stopped by a top flange. A hydropneumatic actuator 727 having an output shaft meshed with a bevel gear 728 is inserted through a central hole 725 in the housing block 724 along a longitudinal direction thereof. The central hole 725 and an inclined hole 726 communicate with each other at the low portion of the housing block 724. An inclined shaft 729 is rotatably inserted in the inclined hole 726. The two ends of the inclined shaft 729 extend outside the inclined hole 726, respectively. A bevel gear 730 fixed at the upper end of the inclined shaft 729 is meshed with the bevel gear 728 mounted on the actuator 727. A clamp unit 770 (to be described later) is mounted on the lower end of the inclined shaft 729.

A connector feed cylinder 731 is connected to the main body 720. A connector holding shelf 732 open toward the clamp unit 770 is formed at the lower end of the connector feed cylinder 731. The feed cylinder 731 is connected to the connector CR feeder through, for example, a flexible hose. The connectors CR are fed one by one. Each connector CR drops through the feed cylinder 731 and is held upright by the holding shelf 732.

As shown in FIG. 11, a shaft 727*a* integral with the output shaft extends from the top end of the actuator 727. A limit actuator element 733 radially extends and is fixed to the shaft 727*a*. A pair of limit switches 734*a* and 734*b* as sensors are arranged to be spaced apart by a central angle of 180° of the housing block 724 within the rotational range of the limit actuator element 733. Limit switches 735*a* and 735*b* are also arranged on the upper surface of an upper structure 790.

The upper structure 790 is positioned by support bolts 794 and comprises: a cover member 792 with inclined surfaces 793 respectively engaged with the limit switches 735*a* and 735*b*; and a compression coin spring 791 inserted between the cover member 792 and the housing block 724. The housing block 724 is always biased downward by the compression coil spring 791.

Figure 13:
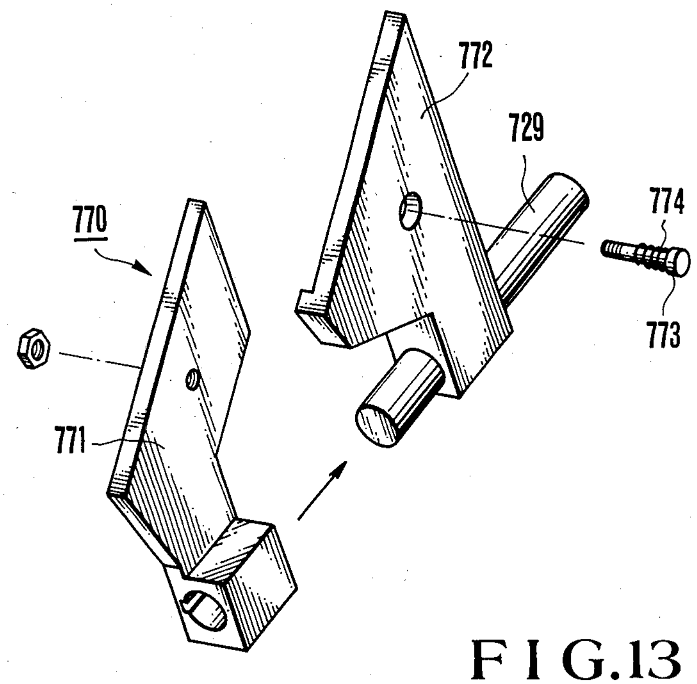
FIG. 13 is an exploded perspective view of a clamp unit.
Figure 14:
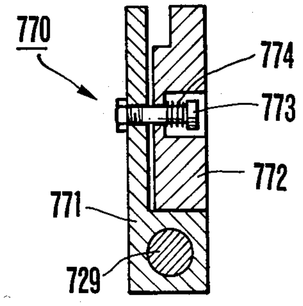
FIG. 14 is sectional view of the clamp unit.

The structure of the clamp unit 770 is illustrated in FIGS. 13 and 14. A fixed pawl 771 is mounted on the lower end portion of the inclined shaft 729. A movable pawl 772 is loosely engaged together with the fixed pawl 771. A compression coil spring 774 is mounted on a pin 773 extending through the fixed and movable pawls 771 and 772. The movable pawl 772 is attracted by the biasing force of the spring 774 toward the fixed pawl 771. Therefore, the clamping unit 770 is kept in the normally closed state.

Figure 15:
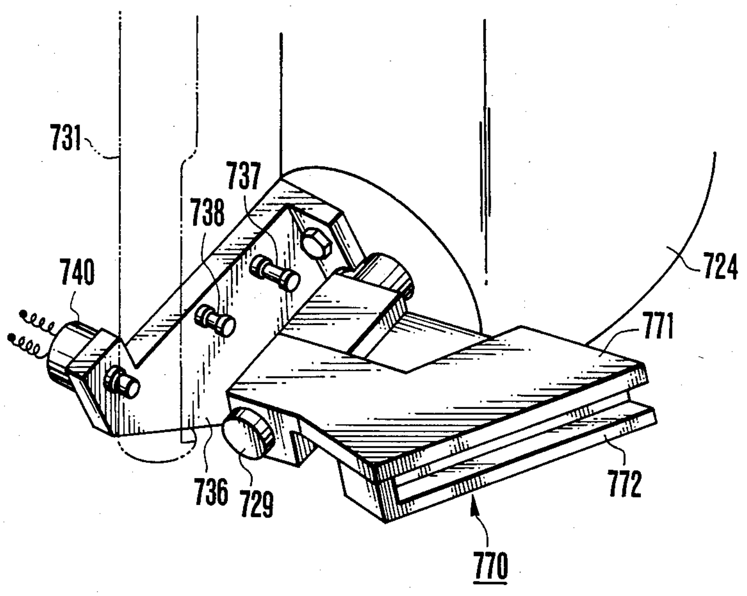
FIG. 15 is a perspective view showing the clamp unit and a stopper mechanism.
Figure 16:
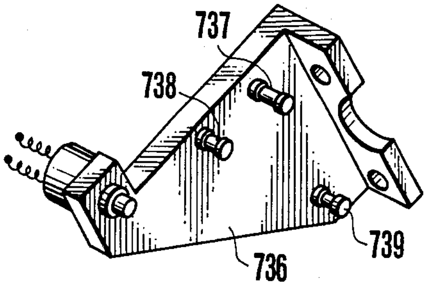
FIG. 16 is a perspective view of a bracket shown in FIG. 15.

FIG. 15 shows the lower portion of the housing block 724 when the clamp unit 770 and the stopper mechanism are mounted. FIG. 16 shows the stopper mechanism. Referring to FIGS. 15 and 16, two stoppers 737 and 738 extend upward from a bracket 736 fixed to the main body 720 near the holding shelf 732 of the feed cylinder 731 and abut against the clamp unit 770 kept in the vertical state (the state indicated by the solid line of FIG. 11). The stopper 737 longer than the stopper 738 abuts against the movable pawl 772 and the stopper 738 abuts against the fixed pawl 771. When the clamp unit 770 stands up, the movable pawl 772 is brought into contact with the long stopper 737 and will be no longer rotated. The fixed pawl 771 is moved until it abuts against the short stopper 738, so that the clamp unit 770 is opened about the shaft 729 inclined at an angle of about 45°. In this state, the clamp unit 770 can clamp the connector CR on the holding shelf 732. However, when the clamp unit 770 lies as indicated by the alternate long and two short dashed line of FIG. 11, the movable pawl 772 abuts against the stopper 737 and is stopped.

The operation of the clamp unit 770 will be described hereinafter. The clamp unit 770 is first kept in the standing state as indicated by the solid line in FIG. 11. The clamp unit 770 is opened and faces the holding shelf 732. When the connector CR drops through the feed cylinder 731 and reaches the holding shelf 732, a reflection type photoelectric sensor 740 detects that the connector has reached the shelf 732. The actuator 727 is started to rotate the inclined shaft 729, so that the clamp unit 770 is gradually lying from the standing state and is separated from the holding shelf 732. When the fixed pawl 771 is gradually separated from the stopper 738, the opening of the clamp unit 770 is closed by the biasing force of the compression coil spring 774, and the connector CR is clamped by the clamp unit 770.

When the actuator 727 is rotated through 180°, the clamp unit 770 abuts against the stopper 739 of the bracket 736, and the limit actuator element 733 actuates the limit switch 734*b*. A timing signal is supplied from the limit switch 734*b* to the control device (FIG. 3), and the inclined shaft 729 is stopped. In this case, the clamp unit 770 abuts against the stopper 738 of the bracket 736 and lies as indicated by the alternate long and two short dashed line of FIG. 11, so that the connector CR is kept horizontal. The hand 10C for holding the base plate 710 is moved downward along the Z-axis direction, and the head 7 as a whole is moved downward. The connector CR is pressed into the connector holding tool 13 of FIGS. 1 and 4. In order to assist such mounting, the hand 10C is slightly moved downward from a position where the housing block 724 completes mounting of the connector CR. The compression coil spring 791 biases the connector CR downward, thereby reinforcing the mounting force. The main body 720 and the upper structure 790 are moved downward relative to the housing block 724. When the cover member 792 actuates the limit switch 735*a*, the limit switch 735*a* generates a signal representing that the connector CR is firmly mounted. In this case, when the limit switch 735*a* is not operated, this indicates that the housing block 724 is not properly moved downward. When the limit switches 735*a* and 735*b* are simultaneously operated, it indicates that the housing block 724 is excessively moved downward. In any case, the central processing unit CPU generates a control signal to halt the system in accordance with the content of the output signals from the limit switches.

When the connector CR is completely mounted, the hand 10C is moved along the Z-axis direction, and the head 7 is moved upward as a whole. Meanwhile, the clamp unit 770 is kept closed. Since the clamping force by the compression coil spring 774 is smaller than the clamping force of the tool 13 acting on the pins of the connector CR, the connector CR is naturally left in the clamp unit 770 when the unit 770 is moved upward.

However, when the number of pins of the connector is small and the connector cannot be firmly clamped, a push pin driven by a solenoid may be provided in the main body 720. In this case, when the connector is loaded in the tool, the push pin pushes the movable pawl 772 to open the clamp unit 770 which then releases the connector.

When the head 7 is moved upward to a predetermined level, the actuator 727 is rotated in the reverse direction. The clamp unit 770 gradually stands up, and the fixed pawl 771 abuts against the stopper 738 and is stopped. In this manner, when the clamp unit 770 is rotated through 180°, the limit actuator element 733 actuates the limit switch 734*a* which then supplies a timing signal to the control device (FIG. 3). In this case, the clamp unit 770 restores the standing state indicated by the solid line of FIG. 11. The movable pawl 772 is in contact with the stopper 737, and the clamp unit 770 is widely opened and faces the holding shelf 732. The clamp unit 770 performs the same operation as described above for the next connector CR subsequently supplied to the holding shelf 732.

As described above, according to the connector setting head of this embodiment, the connector fed in the upright state can be fed horizontally when the clamp unit 770 is rotated through 180°. In addition, the main body rotates itself through 360°, so that the setting direction of the connector can be simultaneously determined, thereby simplifying setting and mounting of the connector to the tool.

Figure 17:
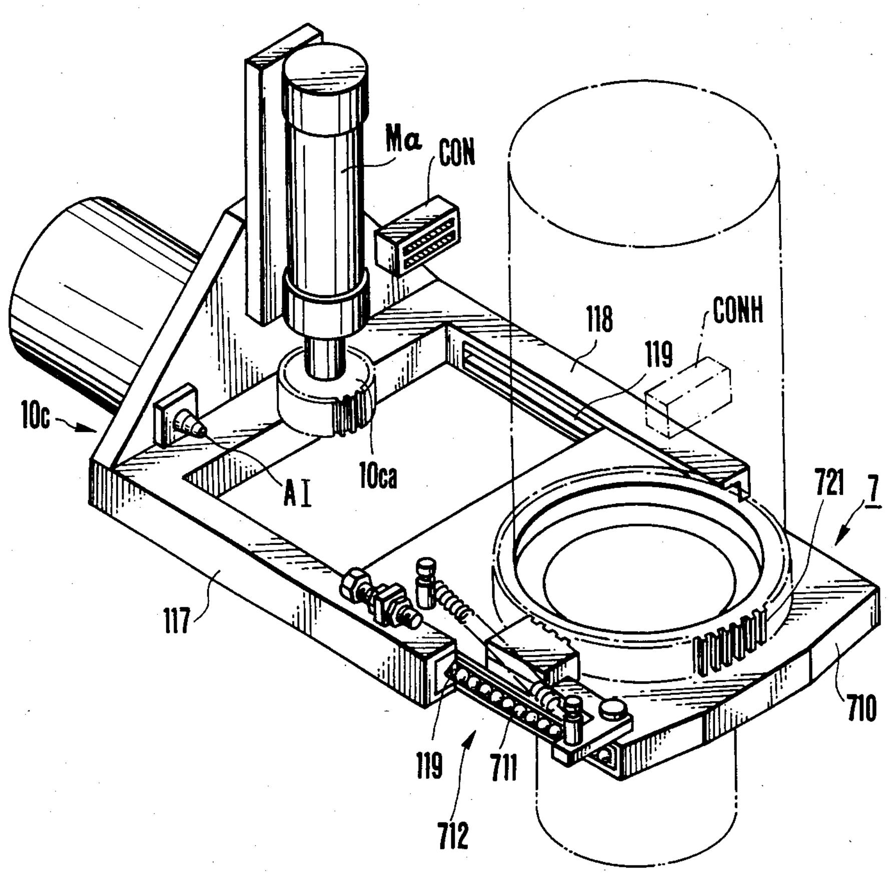
FIG. 17 is a perspective view for explaining a state of engagement between the connector setting head and the hand of the control unit.

FIG. 17 shows a state of engagement between the connector setting head 7 and the robot hand 10C. Referring to FIG. 17, the robot hand 10C has the gear 10C*a* meshed with the gear 721 of the head 7 so as to rotate the head 7 by itself upon operation of the actuator, i.e., the motor Mα under the control of the control device (FIG. 3). Line bearings 711 are engaged with engaging grooves 119 of supports 117 and 118 of the hand 10C which are supported to be parallel to each other, respectively. The head 7 is located to a position where the gear 721 of the head 7 is aligned with the gear 10C*a* of the robot hand 10C. Therefore, the head 7 is engaged with the hand 10C by means of a clamp mechanism (not shown) arranged at the bottom surface of the robot hand 10C. In this case, air is supplied from an air supply port AI of the hand 10C to an air control mechanism of the head 7. The head 7 is electrically connected to the hand 10C from a connector CON in the hand 10C to a connector CONH in the head 7. Outputs from the sensors are supplied to the sequence controller SCONT (FIG. 3) through these connectors. The sequence controller SCONT is connected to the actuator in the head 7. When the head 7 is engaged with the hand 10C, a rack mechanism 712 is released. As described above, the work head rotates by itself. When the head 7 is housed in the housing unit having the same housing structure as in the hand 10C, the rack mechanism 712 is actuated to fix the reference position of the head 7.

The engaging mechanism for the head 7 and the hand 10C is also provided for other heads 8 and 9 and the hand 10C in the same manner as described above.

Figure 18:
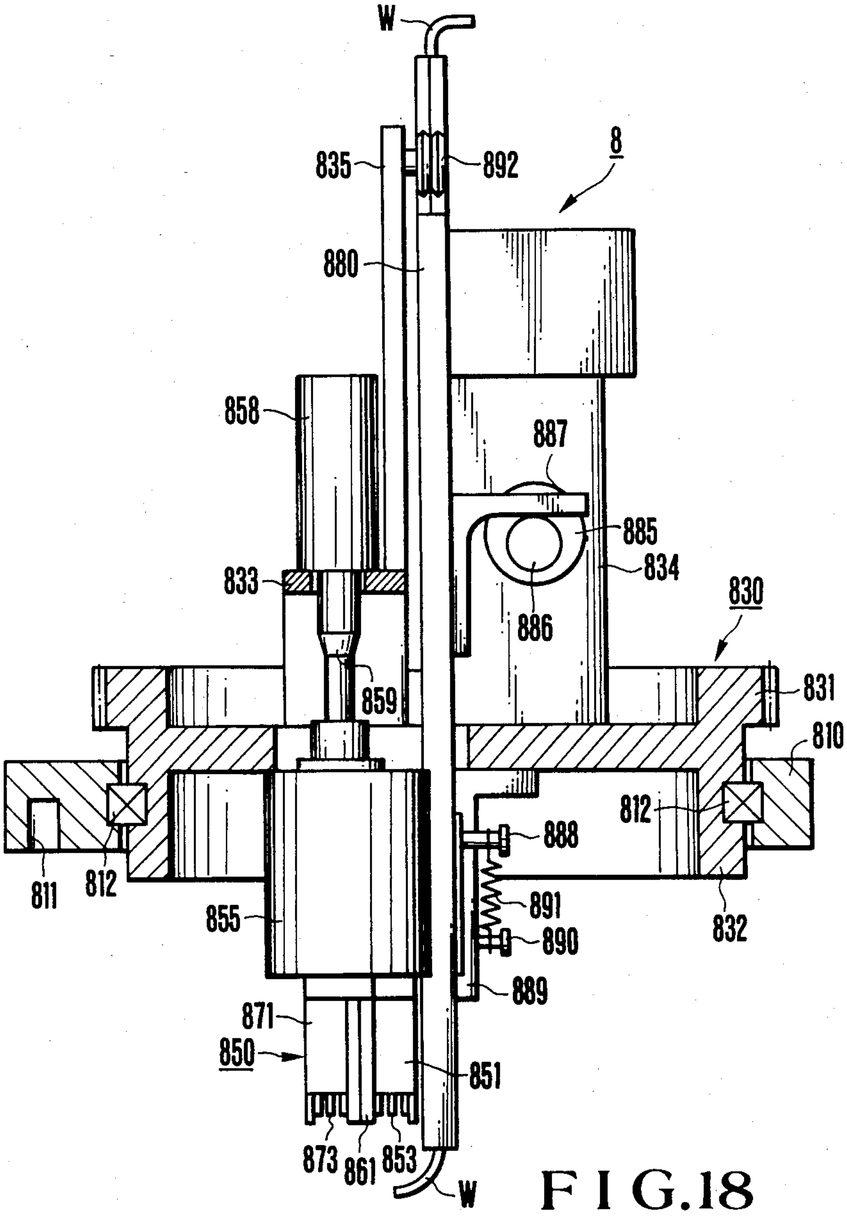
FIG. 18 is a side sectional view of the wiring/nipping head.
Figure 19:
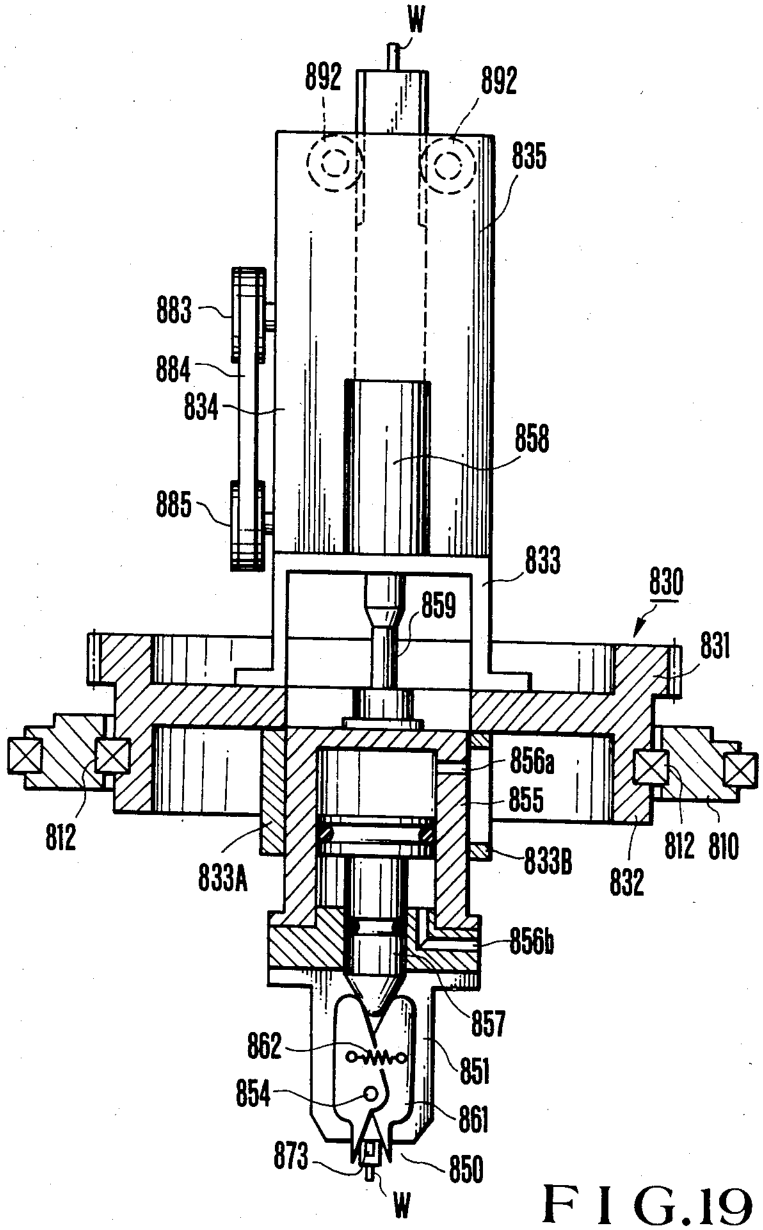
FIG. 19 is a front sectional view of the wiring/nipping head.
Figure 20:
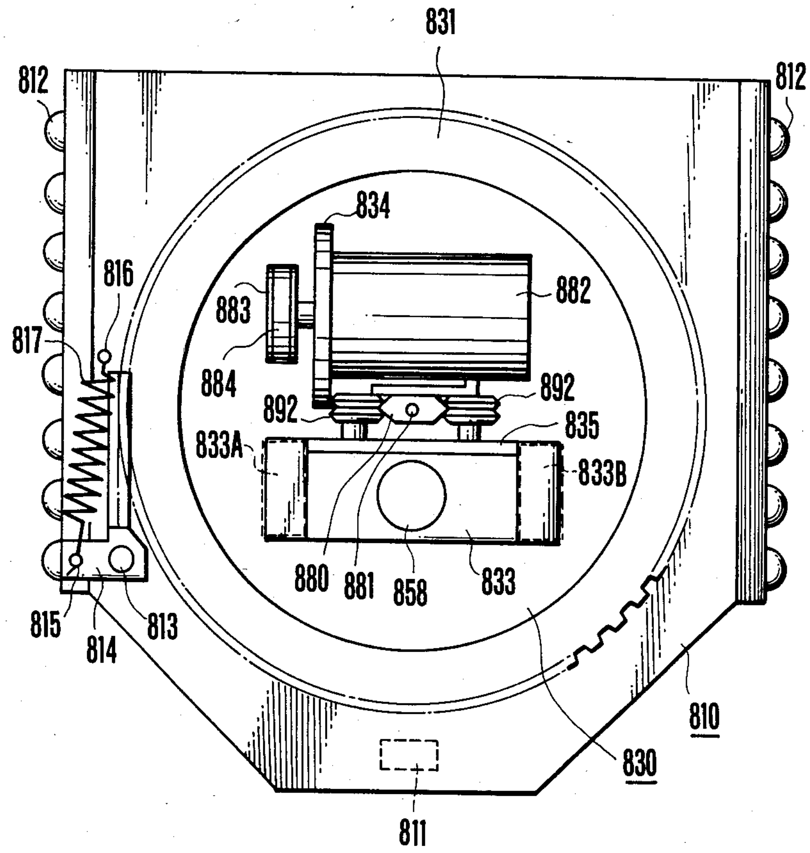
FIG. 20 is a plan view of the wiring/nipping head.

FIGS. 18 and 19 show a detailed structure of the wiring/nipping head 8, and the main part thereof will be described. Referring to FIGS. 18 and 19, the wiring-/nipping head 8 comprises a base 810 engaged with the hand 10C of the robot 10, a main body 830 which is supported by the base 810 and which rotates by itself upon operation of an actuator 10C*b* of the hand 10C, a nipping block 850 arranged below the main body 830 to be vertically movable, and a sleeve 880 vertically extending through the main body 830.

The main body 830 comprises a circular member. A gear 831 meshed with the gear 10C*a* (FIG. 17) of the hand 10C is provided in the upper portion of the main body 830. The gear 831 is arranged to mesh with the gear 10C*a* of the hand 10C. A cylinder 832 having a lower opening is arranged below the lower portion of the main body 830. A first stand 833 extends from the upper surface of the main body 830. Second and third stands 834 and 835 extend above the upper surface of the main body 830.

The base 810 horizontally and rotatably supports the main body 830 through a bearing. A recess 811 formed in the bottom surface near the distal end of the base 810 is engaged with a hooker when the wiring/nipping head 8 is inserted in or removed from the work head housing unit 3.

Line bearings 812 are arranged at two sides of the base 810 and are engaged with unit or hand grooves when the wiring/nipping head 8 is inserted in or removed from the work head housing unit 3. For example, the line bearings 812 engage with the supports 117 and 118, respectively. The hand 10C can be engaged with the rear portion of the base 810. The gear 10C*a* (FIG. 17) incorporated in the hand 10C is meshed with the gear 831 of the main body 830. When the gear 10C*a* of the hand 10C is driven by a proper drive mechanism, the main body 830 is turned horizontally about the central axis.

A pin 813 extending on one side surface of the base 810 is loosely engaged with an L-shaped locker 814. A rack is formed in one branch of the locker 814. A tension spring 817 is mounted between a pin 815 extending on the surface of the other branch and a pin extending on the upper surface of the base 810. When the wiring-/nipping head 8 is not held by the hand 10C, the rack of the locker 814 is engaged with the gear 831 by the biasing force of the tension spring 817 to prevent the main body 830 from free rotation. However, when the wiring/nipping head 8 is held by the hand 10C, the locker 814 is urged by a press member of the hand 10C and rotated counterclockwise. The rack of the locker 814 is disengaged from the gear 831, so that the main body 830 can be freely rotated. The free rotation prevention mechanism of the main body 830 is not limited to the above arrangement. A proper means can be used.

Figure 21:
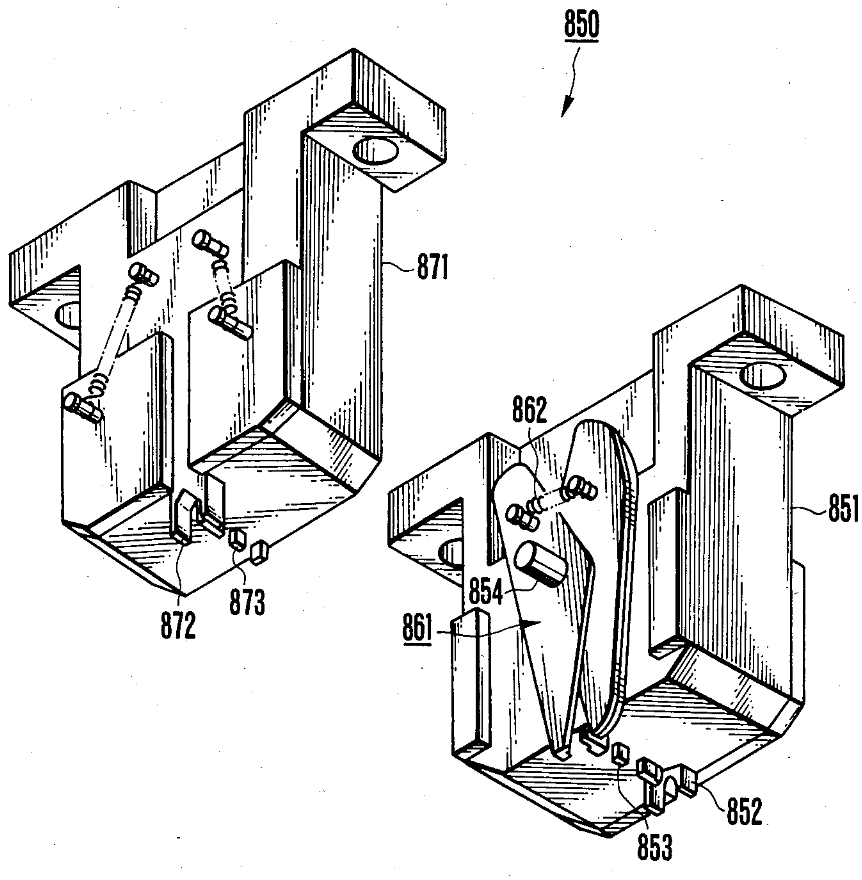
FIG. 21 is an exploded perspective view showing the main part of the wiring/nipping head.
Figure 22:
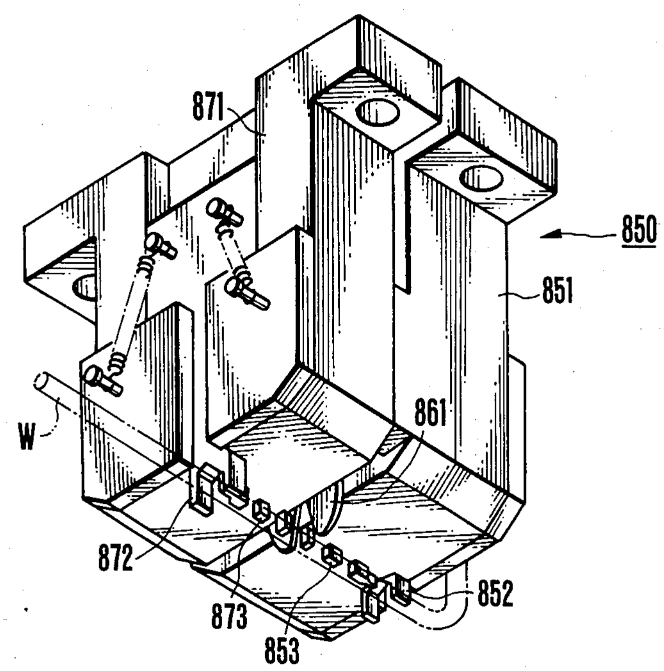
FIG. 22 is a perspective view showing the main part of the wiring/nipping head.

The structure of the nipping block 850 is illustrated in FIGS. 21 and 22. The nipping block 850 comprises a front block member 851, a cutter 861 and a rear block member 871. The block 850 can be vertically movable along guides 833A and 833B mounted at the lower surface of the gear 831 and suspends from a rod 859 of an actuator 858 mounted on the first stand 833. The "front" of the block means the front side along the feed direction of the wiring/nipping head 8 when wiring is performed. As shown in FIGS. 21 and 22, a slide guide 852 for the wire W at the front end of the bottom surface of the front block member 851. A nipping projection 853 which can be engaged with the recess of the connector CR is formed behind the slide guide 852. Similarly, a slide guide 872 for the wire W is arranged at the rear end of the bottom surface of the rear block member 871. A nipping projection 873 is formed in front of the slide guide 872.

The slide guides 852 and 872 serve as members for conduction check. When the slide guides 852 and 872 are in contact with the tool 13 for holding the connector CR, the guides 852 and 872 are kept at the identical potential. The tool 13 is electrically connected to the contact of the connector through the corresponding conduction check pin and is insulated from the ground potential. When the wire W is nipped in the connector CR, the wire W is held at the same potential as that of the conduction check pin. When the tool 13 is brought into contact with the slide guides, the tool 13 is held at the ground potential. In other words, when nipping is normally completed, the wire W is held in the ground potential. However, when a nipping failure occurs, the wire W is not set in the ground potential. In this manner, by checking the potential of the wire W, nipping failure can be checked, as described with reference to FIGS. 4 to 8.

Figure 23A:
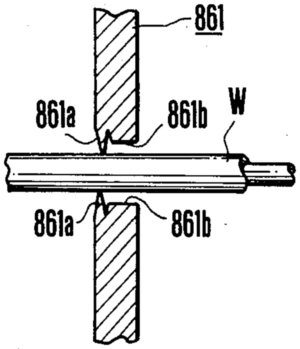
FIGS. 23A and 23B are respectively sectional views showing the arrangement of a cutter of the wiring/nipping head.
Figure 23B:
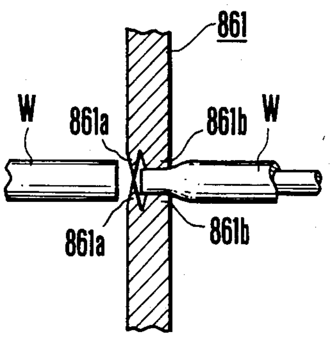
Figure 24:
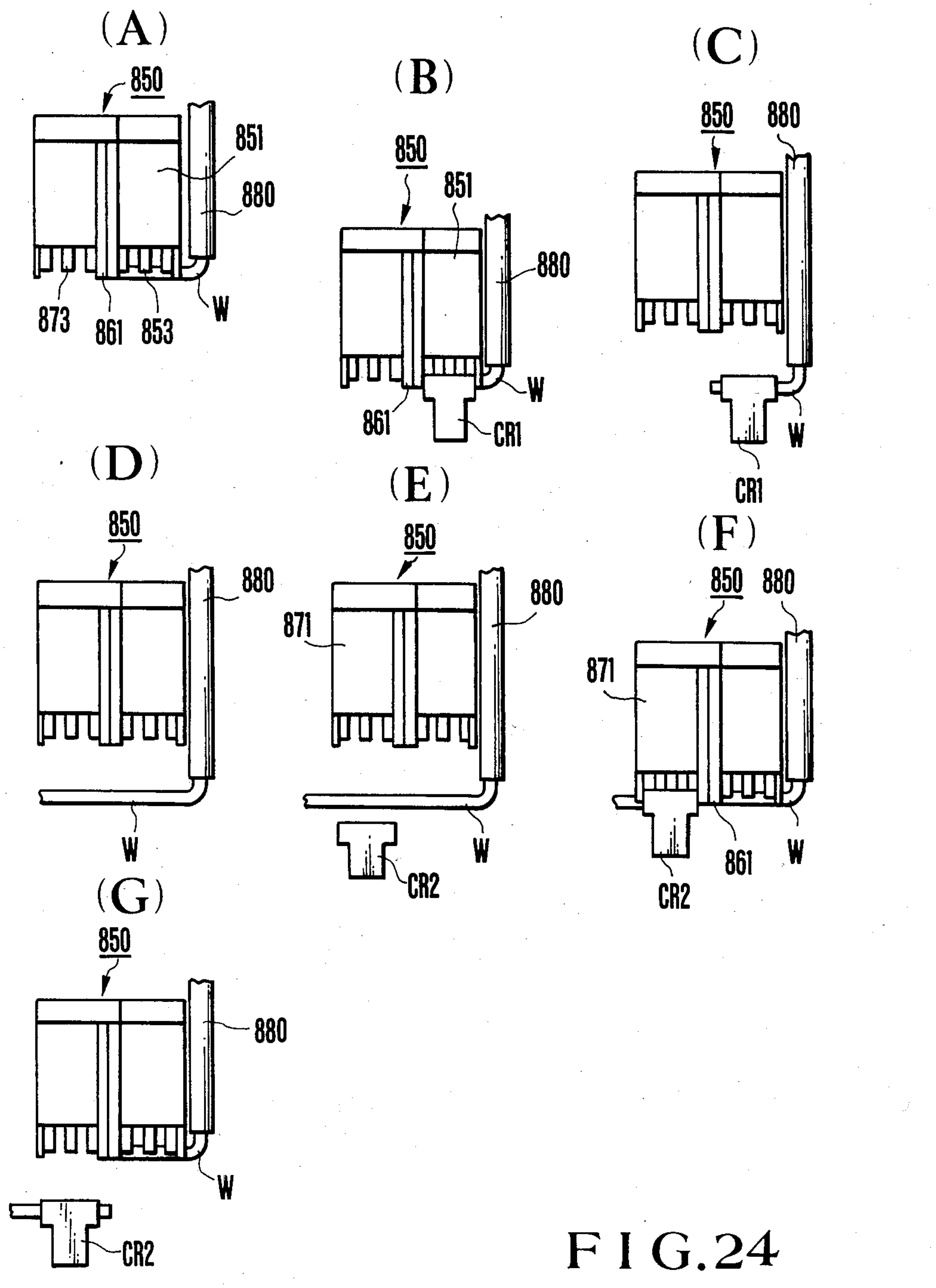
FIGS. 24A to 24G are respectively views showing steps in operation of the wiring/nipping head.

The cutter 861 comprises blades constituting a pair of scissors which are loosely engaged with a pin 854 extending from the rear surface of the front block member 851. The blades are opened by a tension spring 862 arranged therebetween when a taper spindle 857 is withdrawn. Each blade has a cutting portion 861*a* and a clamping portion 861*b*, as shown in FIG. 23A. When the wire is cut, the clamping portions 861*b* of the blades clamp the wire W, as shown in FIG. 23B.

The taper spindle 857 (FIG. 19) is loosely fitted in a cylinder case 855 fixed on the upper surface of the nipping block 850. The lower end of the spindle 857 is directed toward the meeting point of the blades of the cutter 861. A fluid connection port 856*a* and a port 856*b* are formed in the case 855. When a pressure fluid is supplied to the port 856*a*, the taper spindle 857 is inserted between the blades of the cutter 861, and the cutter 861 is closed against the biasing force of the tension spring 862. As shown in FIG. 23B, when the wire W is cut, the wire is clamped by the cutting and clamping portions 861*a* and 861*b*. When the pressure fluid supplied through the hand 10C is exhausted through the port 856*a* and the pressure fluid is supplied to the port 856*b* through the hand 10C, the taper spindle 857 is withdrawn and the cutter 861 is opened by the biasing force of the tension spring 862. As a result, the wire W is released.

The sleeve 880 has an elongated structure. A through hole 881 for guiding the wire W is formed in the sleeve 880 along the longitudinal direction thereof. A pulley 883 mounted on the output shaft of a drive motor 882 on the second stand 834 on the main body 830 is looped with a driven pulley 885 mounted on the second stand through a belt 884. An eccentric cam 886 mounted on the driven pulley 885 is engaged with a driven member 887 fixed on the sleeve 880. A tension spring 891 is bridged between a pin 888 of the sleeve 880 and a pin 890 on a fixed bracket 889 on the main body 830. When the eccentric cam 886 is rotated, the sleeve 880 is vertically moved. The tension spring 891 biases the eccentric cam 886 downward so as to cause it to vertically move. A rack is formed at the upper portion of the sleeve 880 and meshed with a pair of guide wheels 892 mounted on the third stand 835. Therefore, the vertical movement of the sleeve 880 can be stably performed.

The operation of the wiring/nipping head will be described in detail with reference to FIGS. 24A to 24G.

FIG. 24A show the initial state of the wiring/nipping head. The initial set cannot be automatically performed. A setter pulls the wire W from the sleeve 880 and causes the pressure fluid to operate the taper spindle 857. The taper spindle 857 is inserted between the blades, and the end of the wire is clamped between the clamping portions 861*b* of the cutter 861. In this case, the actuator 858 is not actuated, and the wiring/nipping head 8 is kept at the upper position.

The wiring/nipping head 8 is held by the hand 10C of the robot 10 and moved to the position of a connector CR1 which is first held by the connector holding tool 13 and which is located on the wiring table 2. In this state, the block 850 is moved downward, and the wire W is nipped by the front block member 851 into the connector CR1, as shown in FIG. 24B.

The taper spindle 857 is operated by the pressure fluid to withdraw the opener to open the cutter 861. The wire W is thus released. Subsequently, the actuator 858 is driven to move the block 850 upward along the guides 833A and 833B, and wiring is started, as shown in FIG. 24C.

As shown in FIG. 24D, the wiring/nipping head 8 performs wiring along a predetermined route while it pulls the wire W, and the head 8 is moved to the next connector position.

When the wiring/nipping head 8 reaches the position of a next connector CR2, the head 8 is stopped such that the rear block member 871 corresponds to the second connector CR2, as shown in FIG. 24E.

In this state, the actuator 858 is turned off and the nipping block 850 is moved downward. The wire is nipped by the rear block member 871 into the connector CR2, as shown in FIG. 24F. At the same time, the taper spindle 857 is moved downward by the pressure fluid. The taper spindle 857 is moved between the blades of the cutter 861 to close the cutter 861. The wire W is cut by the cutting portions 861*a* and then clamped by the clamping portions 861*b*. This state is illustrated in FIG. 24G.

When cutting is completed, the state of FIG. 24A is restored, and the operation described above is repeated.

When wiring is to be performed without cutting the wire W, the cutter 861 is not closed in the state of FIG. 24F. In this case, the wire W is nipped in the connector CR2 and passes therethrough. The continuous wire W is then nipped in the next connector.

As described above, the wiring/nipping head according to this embodiment has a cutter having the cutting and clamping functions between the front and rear block members having nipping projections on their bottom surfaces. The blades of the cutter face the nipping projection. When the wire cut end is clamped by the cutter, the front block member nips the wire in the connector. When the wire is supplied from the wiring sleeve and wiring is performed, the rear block nips the wire in the connector. The wire is cut as needed. Therefore, arbitrary terminals of the connector can be selected and subjected to wiring. In addition, when the wire is nipped in the connector, wire cutting can be selectively performed. Therefore, a continuous wire can be patterned through a plurality of connectors.

According to this embodiment, when a single core wire is nipped in the connector on the wiring table, no manual operation is required. In addition, wiring flexibility can be improved, thus providing a great industrial advantage.

FIGS. 25 to 28 show a detailed structure of the connector feeder 4. The feeder 4 comprises a transfer unit 400, a drive mechanism 480 for horizontally moving the transfer unit 400, and a magazine 490 for storing connectors supplied to the transfer unit 400.

The drive mechanism 480 comprises a pair of guide bars 481 which horizontally extend, and a screw shaft 482 extending parallel to the guide bars 481. The screw shaft 482 is operatively coupled to a reversible motor 484 (i.e., the motor MS) through a pulley 483 fixed at one end of the screw shaft 482. This drive motor comprises a known motor which is rotated in the forward or reverse direction by a predetermined angle under the control of the computer of the robot 10. The guide bars 481 are loosely fitted with the transfer unit 400, and the screw shaft 482 is screwed in the transfer unit 400.

The magazine 490 is located on a stand 491 standing behind the drive mechanism 480. Several rows of connector cases 498 extend between support plates 492 and 493 along the right-and-left direction. The connectors CR in each case 494 are stacked along a direction perpendicular to the upper and lower support plates 492 and 493 (i.e., a direction from the lower left corner to the lower right corner). The several cases in each row are stacked along a direction between the support plates 492 and 493 (i.e., a direction from the lower right direction to the upper left direction).

Figure 25:
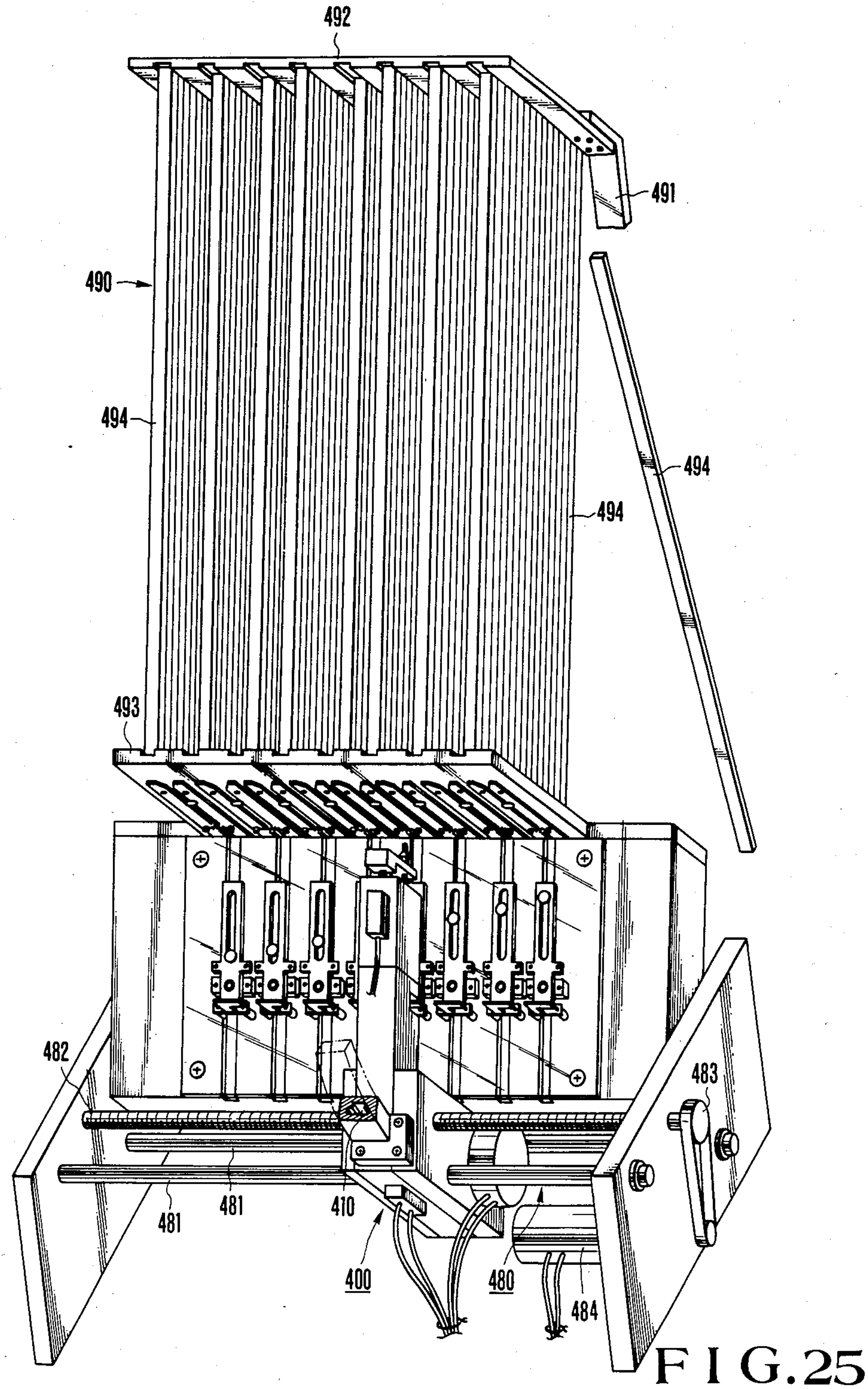
FIG. 25 is a perspective view showing the overall configuration of a nipped connector automatic feeder.
Figure 26:
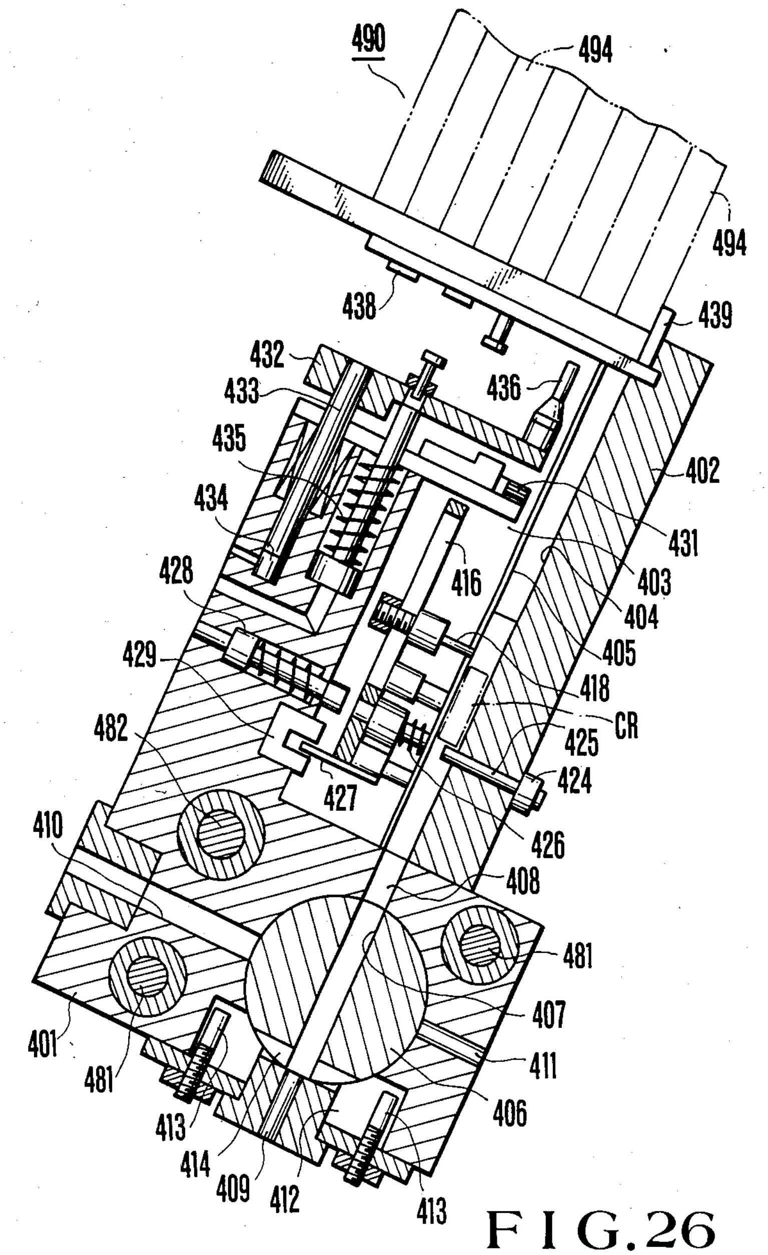
FIG. 26 is a longitudinal sectional view of a transfer unit shown in FIG. 25.

The structure of the transfer unit 400 is illustrated in FIG. 25. The transfer unit 400 comprises a base block 401 and a feed block 402 which are combined to constitute an integral body. The base block 401 is loosely fitted with the guide bar 481 and threadably engaged with the screw shaft 482. The base block 401 is located above the feed block 402. A box-like space 403 is formed between the base block 401 and the feed block 402.

A connector feed groove 404 is formed in a surface of the feed block 402 which defines the space 403 along the upper and lower ends. Most of the portion of the surface defining the space 403 is covered with a thin transparent plate 405.

A rotor 406 is arranged in the base block 401 to be rotatable through 80° about a horizontal axis parallel to the guide bar 481. A through hole 407 having the same cross sectional shape as that of the connector feed groove 404 is formed along the radial direction of the rotor 406. A connector introducing hole 408 is formed above the through hole 407 in the base block 401 so as to cause the through hole 407 to communicate with the feed groove 404 while the rotor 406 is in the upright state as illustrated. A suction hole 409 is formed in the base block 401 below the through hole 407 while the rotor 406 is in the upright state. The suction hole 409 is connected to a proper suction source (not shown) to cause the connector CR to drop in the feed groove 404 due to a negative pressure caused by evacuation. A connector delivery hole 410 is formed in front of the through hole 407 of the rotor 406 in the base block 401 so as to communicate therewith while the rotor 406 is rotated through 90° in the front direction (left in FIG. 26). A compressed air supply hole 411 is formed behind the through hole 407 in the base block 401 so as to communicate therewith. The delivery hole 410 is connected to the connector setting head through a hose or the like.

A photosensor 413 is arranged in a space 412 formed below the rotor 406. Light from the photosensor 413 crosses the through hole 407. A notched portion 414 is formed in the bottom while the rotor 406 is in the upright state. When the photosensor 413 detects that the connector CR is inserted in the rotor 406, the rotor 406 is rotated in the front direction, so that the compressed air is supplied to the hole 411 and the connector CR is delivered through the delivery hole 410.

The connectors CR must be dropped one by one from the feed groove 404 to the through hole 407 of the rotor 406. The dropping mechanism will be described in detail with reference to FIG. 27. This mechanism is mainly housed in the space 403 in the base block 401. An operation plate 416 extending substantially parallel to a connector feed direction (i.e., a direction from the upper right direction to the lower left direction in FIG. 27) can be moved by a guide (not shown) in the space 403 along a direction perpendicular to the connector feed direction. The plate 416 can come closer to or separated from the feed groove 404. A first lock pin 418 is screwed in an elongated hole 417 formed at the upper half of the operation plate 416 and is directed toward the feed groove 404. A push button 421 of an intermediate block 420 entirely appears in a window 419 formed below the elongated hole 417. Four pins 422 extend around the edge of the window 419 toward the feed block 402.

A pin 423 extending from the intermediate block 420 through the feed block 402 supports a holder 424 at the lower surface of the feed block 402. A second lock pin 425 extending forward from the holder 424 faces the feed groove 404 through the feed block 402. A compression coil spring 426 is mounted on the pin 423. A light-shielding plate 427 is mounted at the lower end of the operation plate 416 and extends forward. A distance between the lock pins 418 and 425 along the connector feed direction is the same as the length of each connector CR.

A hydropneumatic piston 428 driven by an actuator is arranged at a position corresponding to the window 419 of the operation plate 416 of the base block 401.

Figure 27:
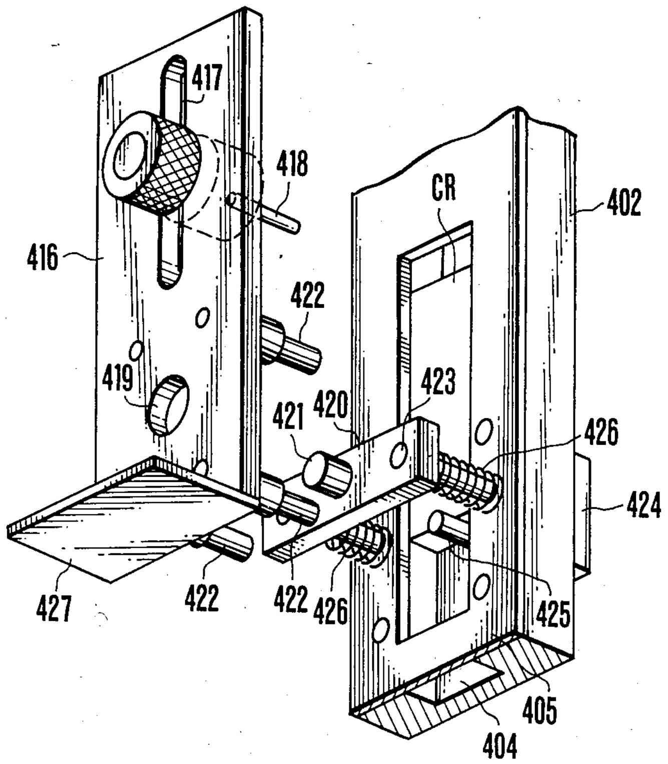
FIG. 27 is a perspective view showing a connector separation/drop mechanism of FIG. 26.

In the state shown in FIG. 27, the piston 428 is not operated yet. The operation plate 416 is biased by the compression coil spring 426 from the feed groove 404, so that the first lock pin 418 is withdrawn from the feed groove 404. The second lock pin 425 is entered in the feed groove 404 and locks the bottom portion of the lowermost connector CR. This state is illustrated in FIG. 28.

When a connector dropping timing is reached, the piston 428 is operated to urge the operation plate 416 and the push botton 421 facing the window 419. The operation plate 416 is located near the feed groove 404, and the first lock pin 418 is entered in the feed groove 404. The first lock pin 418 is entered between the top of the lowermost connector and the bottom of the second lowest connector. The second lowest connector is locked. At the same time, the second lock pin 425 is withdrawn from the feed groove 404. The lowermost connector released from the second lock pin 425 is dropped toward the rotor 406.

When the photosensor 413 detects that the lowermost connector is entered in the rotor 406, the piston 428 is stopped. The operation plate 416 is separated from the feed groove 404 by the biasing force of the compression spring 426. The first lock pin 418 is withdrawn from the feed groove 404, and the previously second lowest connector (currently the lowermost connector) is dropped. However, at the same time, the second lowest connector is locked by the second lock pin 425 entered in the feed groove 404 and will not be dropped in the rotor 406.

The same type of connectors are housed in the cases 494 of the same row in the magazine. However, in practice, different types of connectors are mixed in the cases of the same row. When another type of connector is mixed in, the constitution of the wire harness manufactured by the full-automatic manufacturing syste differs from that of the design specifications. When another type of connector is mixed, the automatic connector feeder must detect this fact. For this purpose, a photosensor 429 is arranged in the base block 401 at a position corresponding to the light-shielding plate 427 of the operation plate 416. The light-shielding plate 427 is located to shield the light from the photosensor 429 when the piston 428 is kept inoperative and the operation plate 416 is separated from the feed groove 404.

In general, different types of connectors have different lengths, i.e., different lengths along the connector feed direction are adapted for the different types of connectors. A distance between the lock pins 418 and 425 is predetermined along the connector feed direction. When the connectors of the same type are successively fed, each has the same length as the distance between the pins. In this case, the first lock pin 418 is entered in the feed groove 404 and the operation plate 416 can come close to the feed groove 404. When the connector is dropped, the light-shielding plate 427 does not shield light emitted from the photosensor 429. However, when another type of connector is fed, its length is different from the distance between the pins. The first lock pin 418 cannot come close or enter into the feed groove 404. As a result, the operation plate 416 cannot come close to the feed groove 404. When this type of connector drops, the light-shielding plate 427 shields the light from the photosensor 429, thereby detecting mixing of another type of connector. When such detection is performed, a proper alarm is produced to the setters.

When the connectors CR are fed from the feed groove 404 to the upper connector case 494 one by one, and each connector is received by the rotor 406, the case 494 and then the feed groove 404 become empty. When the connectors are continuously fed, the case 494 must be replaced with a full case 494. In order to prevent interruption of connector feeding, the connector case must be replaced with a full case even if the connectors are left in the case during operation.

For this purpose, a photosensor 431 is arranged near the upper end of the feed groove 404 and directed toward the feed groove 404. The photosensor 431 is located at a position above the first lock pin 418 by two connectors along the connector feed direction. An operation rod 432 is mounted on the upper surface of the base block 401. A guide pole 433 is loosely fitted in a hole 434 formed in the base block 401. The operation rod 432 is vertically moved by a piston 435 of an actuator with a spring to be parallel to the connector feed direction. A spindle 436 having a columnar portion **436*a* and a conical portion 436*b* is mounted at the other end of the operation rod 432** and extends upward (FIG. 28A).

Each of a pair of right and left case holding plates 438 is loosely fitted at one end thereof around a corresponding one of pins 437 extending on the frame of the magazine 490 above the operation rod 432. Each of pair of right and left poles 439 is fixed at the other end of a corresponding one of the plates 437. Pins 440 extend downward from the lower surfaces of the case holding plates 438, respectively. A tension spring (not shown) is hooked between the pins 440, so that the holding plates 438 are biased to come close to each other. A connector path 441 is formed at a position corresponding to the lower exist of a lowermost case **494*a* between the holding plates 438**.

Figure 28A:
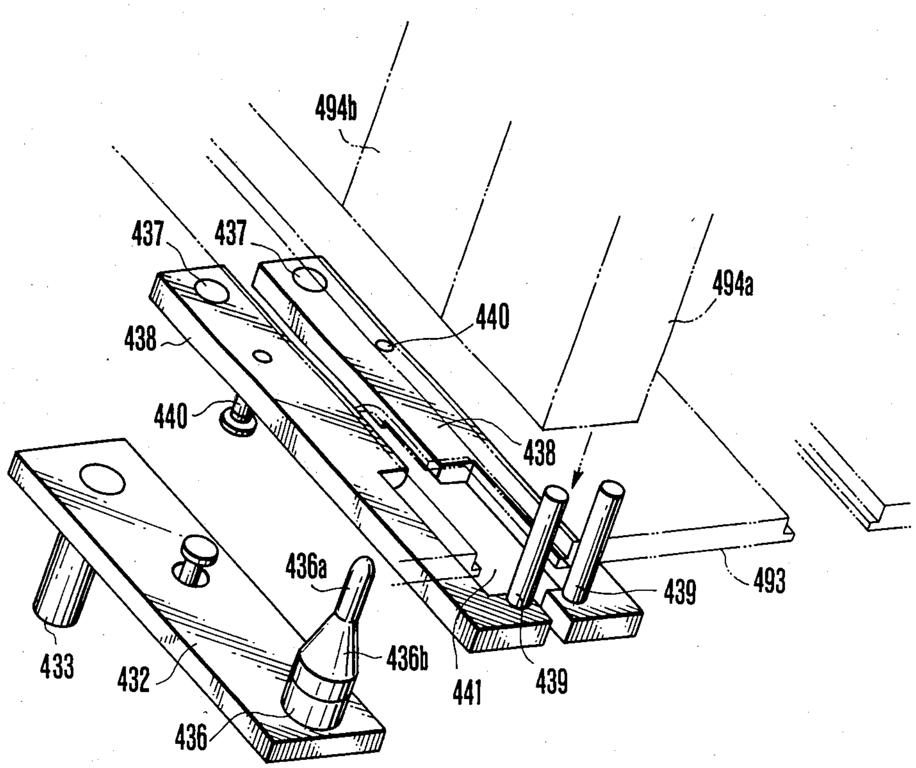
FIGS. 28A and 28B are respectively perspective views showing a replacement mechanism for a connector case.

In the state shown in FIG. 28A, a sufficient number of connectors are left in the transfer unit 400. The operation rod 432 is located at the lower position, and the holding plates 438 are close to each other. The lowermost connector case **494*a* in the row is supported by the poles 439**.

Figure 28B:
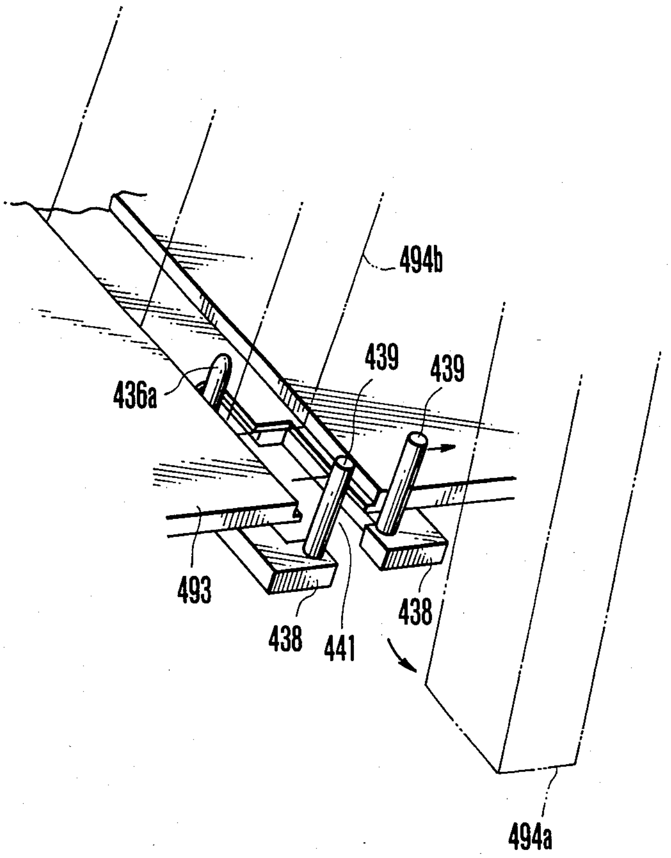

When the photosensor 431 detects that the case must be replaced, the piston 435 is operated to move the operation rod 432 upward. The columnar portion **436*a* of the spindle 436 is inserted in a second lowest case 494*b* (FIG. 28B). When the operation rod 432 is further moved upward, the conical portion 436*b* of the spindle 436 is inserted between the holding plates 438, so that the plates 438 are separated with respect to the pins 437 as the center. Since the poles 439 are separated in the right-and-left direction, the lowermost case 494*a* is not supported and drops by its weight a indicated by the arrow. However, the second lowest case 494*b* is supported by the columnar portion 436*a* of the spindle 436** and will not move.

When the piston 435 is stopped, the operation rod 432 is moved downward by the biasing force of the spring, and the conical portion **436*b* of the spindle 436 is withdrawn from a space between the holding plates 438. The holding plates 438 and then the poles 439 come close to each other, so that the state of FIG. 28A is restored. When the operation rod 432 is further dropped, the columnar portion 436*a* of the spindle 436 is withdrawn, and the second lowest case 494*b* slidably drops along the support plate 493. Therefore, the second lowest case 494*b*** becomes the lowermost case in the row.

When the nipped connector feeder having the arrangement described above is used, the pair of lock pins are inserted in or withdrawn from the connector feed groove, so that the connectors are separated one by one, and each connector is fed to the connector setting head.

Since the spindle having the columnar and conical portions is used to open the pair of holding plates for the connector cases obliquely stacked, the next case can be fed to the feeder after the lowermost empty case is removed. Since case replacement can be properly performed, the connectors can be continuously fed without interruption of even one cycle unless the connector cases are left in the row.

According to the automatic connector feeder of this embodiment, different types of connectors can be fed as needed. Even if a feed order of different types of connectors or a combination thereof is changed, the program loaded in the computer can be changed or updated. Without modifying the apparatus or system, updating can be immediately performed. When the connectors of the same type are used, the connectors are stored in the cases of all rows, thereby continuously feeding the connectors without interruption for a long period of time.

Figure 29:
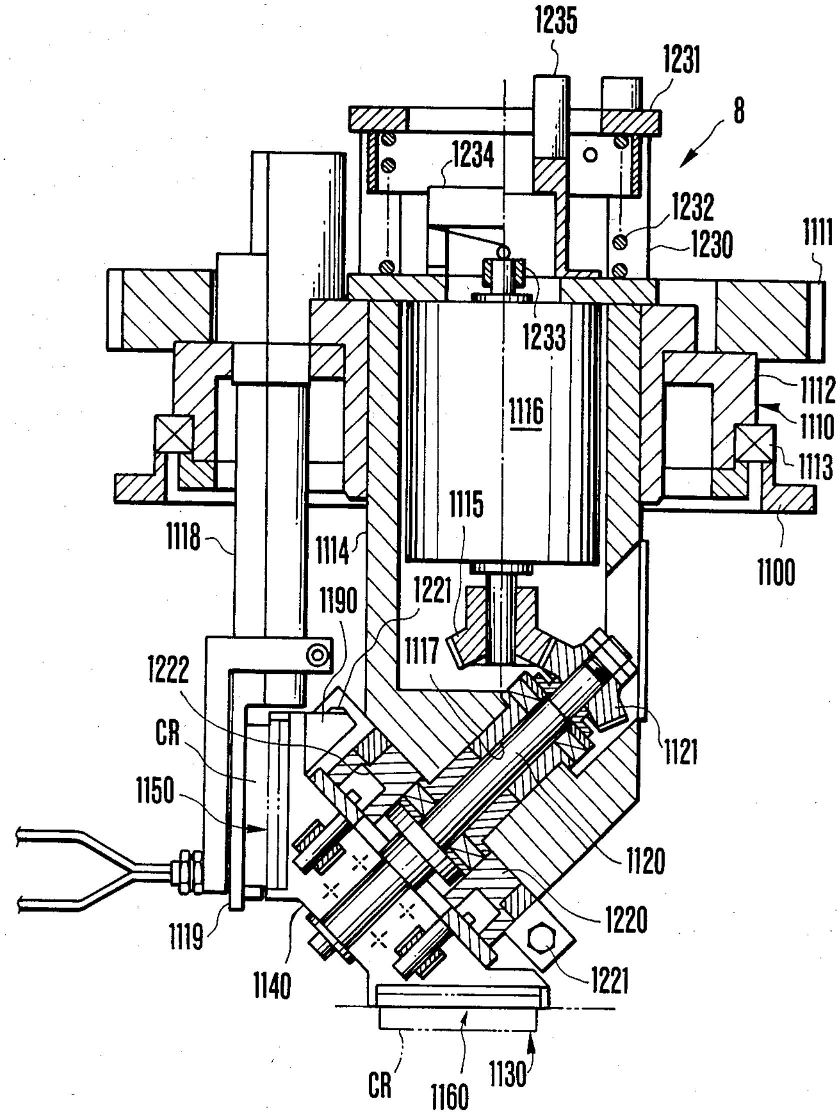
FIG. 29 is a longitudinal sectional view of a connector setting head according to another embodiment of the present invention.

FIGS. 29 to 48 show a modification of a connector setting head 8. Two clamp members are arranged around an inclined shaft 1120. Referring to FIG. 29, the connector setting head 8 comprises: a base 1100 engaged with and held by the hand; a main body 1110 which is supported by the base 1100 and which can be horizontally rotated; a clamp unit 1130 which is supported by an inclined shaft 1120 located at the lower portion of the main body 1110 and which can be rotated through 180°; a disk member 1220 which is located between the clamp unit 1130 and the main body 1110 and which is inserted in the inclined shaft 1120; and an upper structure 1230 coupled to the main body 1110 which is located above the structure 1230.

The main body 1110 comprises a circular member. A gear 1111 and a cylindrical member 1112 rotated together with the gear 1111 are fixed on the main body 1110 through a bearing 1113. The gear 1111 is meshed and engaged with a drive gear incorporated in the robot hand. When the gear of the robot hand is rotated, the main body 1110 is rotated about the central axis (i.e., vertical axis) as a whole.

The main body 1110 is coaxially rotated together with the main body 1110 and has a housing block 1114 inserted therein while the housing block 1114 is stopped by the top flange. A hydropneumatic actuator 1116 having a bevel gear 1115 which is concentrically mounted on an output shaft is housed in an inner chamber of the housing block 1114. An inclined hole 1117 is formed to communicate with the inner chamber at the bottom end in the lower portion of the housing block 1114. An inclined shaft 1120 extends through the inclined hole 1117 through a bearing such that two ends of the shaft 1120 extend outward the two ends of the hole 1117. A bevel gear 1121 mounted at the upper end of the inclined shaft 1120 is meshed and engaged with the bevel gear 1115 of the actuator. The inclined shaft 1120 extends through a disk member 1220 fixed at the lower portion of the housing block 1114. The clamp unit 1130 (to be described later) is fixed at the lower end of the inclined shaft 1120.

A connector feed cylinder 1118 is arranged in the main body 1110 along the longitudinal direction thereof. A connector holding shelf 1119 open toward the clamp unit 1130 is formed at the lower end of the cylinder 1118. The feed cylinder 1118 is coupled t the connector feeder 4 by a feed pipe S. The connectors CR are fed one by one, and each connector CR drops along the feed cylinder 1118 and is held upright on the holding shelf 1119.

A shaft integral with the output shaft extends from the upper end of the actuator 1116. A limit actuator element 1233 is fixed on the shaft integral with the output shaft. A limit switch 1234 lies above the limit actuator element 1233. A limit switch 1235 is arranged upward near the limit switch 1234.

The upper structure 1230 comprises a cover member 1231 engaged with the limit switch 1235, and a compression coil spring 1232 inserted between the cover member 1231 and the housing block 1114. The housing block 1114 is always biased by the compression coil spring 1232 downward.

Figure 31:
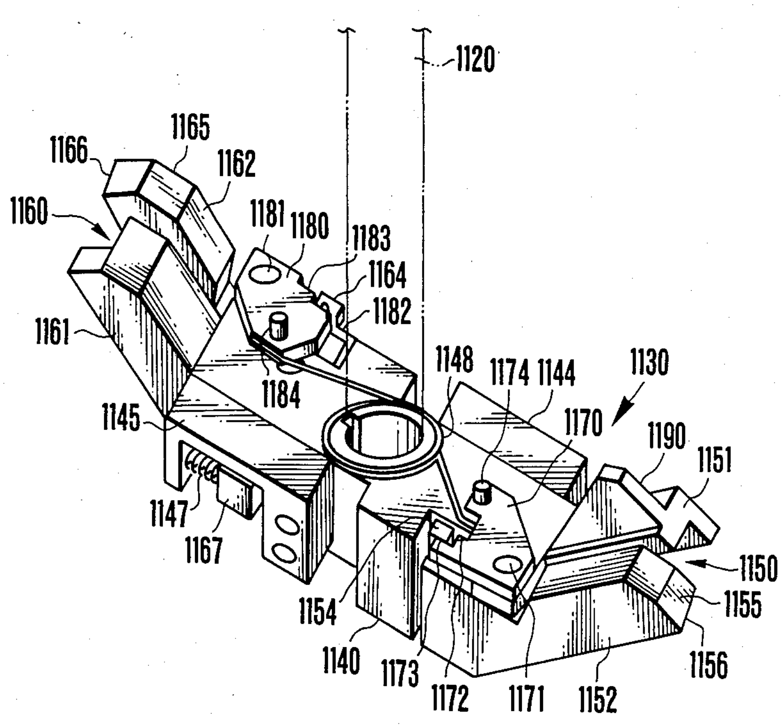
FIG. 31 is a perspective view showing a clamp unit.
Figure 32:
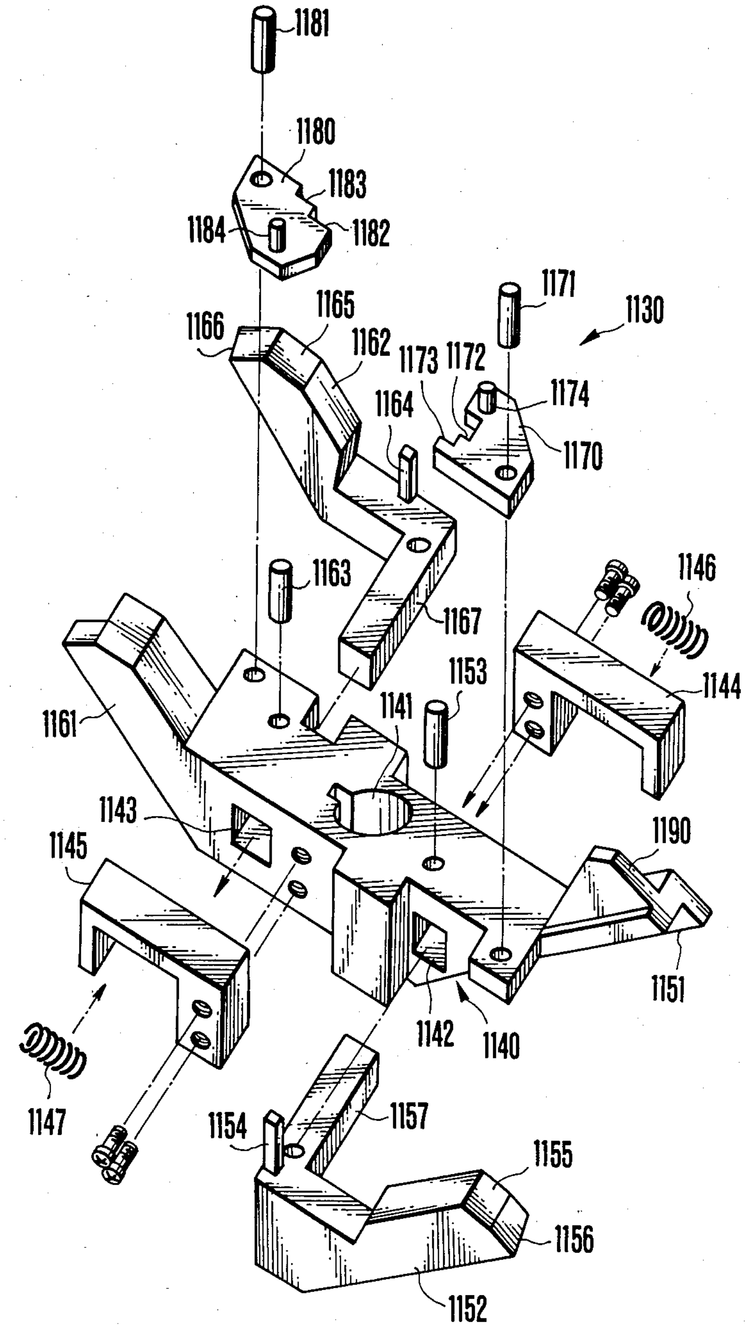
FIG. 32 is an exploded perspective view of the clamp unit.
Figure 33:
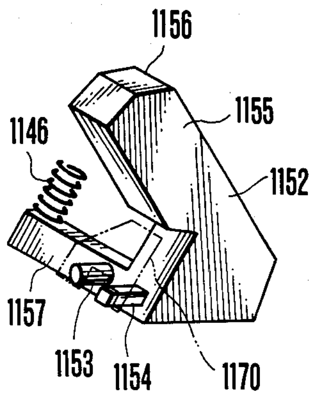
FIG. 33 is a perspective view showing one movable pawl.
Figure 34:
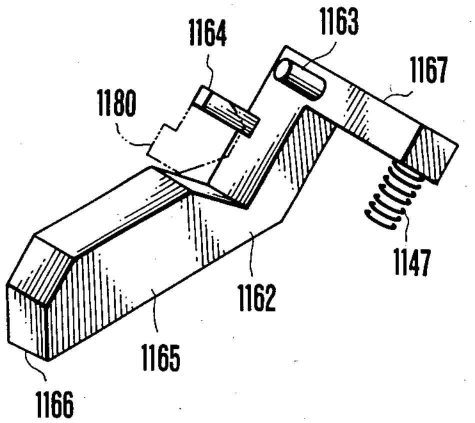
FIG. 34 is a perspective view showing the other movable pawl.

As shown in FIG. 31, the clamp unit 1130 comprises a fixed block 1140, a right clamp member 1150 located to the right of the fixed block 1140 and having a fixed pawl 1151 and a movable pawl 1152, a left clamp member 1160 located to the left of the fixed block 1140 and having a fixed pawl 1161 and a movable pawl 1162, and ratchet members 1170 and 1180 for positioning the movable pawls 1152 and 1162 and opening/closing the clamp members 1150 and 1160, respectively.

The fixed block 1140 has a through hole 1141 through which the inclined shaft 1120 is inserted. The fixed pawls 1151 and 1161 are inclined at an angle of 45° with respect to the central axis of the through hole 1141. The fixed pawls 1151 and 1161 oppose in an inverted V shape. The movable pawl 1152 constituting the clamp member 1150 together with the fixed pawl 1151 comprises a V-shaped pawl piece 1155 toward the inner portion of the clamp member 1150 and a support rod 1157 so as to constitute substantially an L-shaped structure. The pawl piece 1155 corresponding to the fixed pawl 1151 is inclined at an angle of 45° with respect to the support rod 1157. The movable pawl 1162 constituting the other clamp member 1160 together with the fixed pawl 1161 comprises a V-shaped pawl piece 1165 toward the inner portion of the clamp member 1160 and a support rod 1167 to constitute substantially a L-shaped structure. The pawl piece 1165 corresponding to the fixed pawl 1161 is inclined at an angle of 45° with respect to the support rod 1167.

The support rod 1157 of the movable pawl 1152 is loosely fitted in a hole 1142 formed in the fixed block 1140 at the side of the fixed pawl 1151 to extend along the direction of width of the fixed block 1140. The movable pawl 1152 is supported by a pivot shaft 1153 which extends through the hole 1142 and which is fitted with the proximal portion of the support rod 1157. A substantially U-shaped support member 1144 is screwed at the extended portion of the support rod 1157 of the fixed block 1140. A compression coil spring 1146 is inserted between the extended end of the support rod 1157 and the support member 1144 so as to always urge the support rod 1157 to close the clamp member 1150.

Similarly, the support rod 1167 of the movable pawl 1162 is loosely inserted in a hole 1143 formed in the fixed block 1140 at the side of the fixed pawl 1161 along the direction of width of the fixed block 1140. The movable pawl 1162 is supported by a pivot shaft 1163 which extends through the hole 1143 and which is fitted with the proximal portion of the support rod 1167. A substantially U-shaped support member 1145 is screwed at an extended portion of the support rod 1167. A compression coil spring 1147 is inserted between an extended end of the support rod 1167 and the support member 1145. The support rod 1167 is always urged to close the clamp member 1160.

The ratchet members 1170 and 1180 are supported by pins 1171 and 1181 inserted in diagonal positions of the fixed block 1140, respectively. A lock pin 1154 extending on the movable pawl 1152 is locked by steps 1172 and 1173 of the ratchet member 1170 so as to keep the clamp member 1150 open or closed. A lock pin 1164 extending on the movable pawl 1162 is locked by steps 1182 and 1183 of the ratchet member 1180 to keep the cramp member 1160 open or closed.

Reference numeral 1190 denotes a positioning member of the clamp unit 1130. The positioning member 1190 abuts against a stopper 1221 comprising a bolt located near the disk member 1220.

Figure 35:
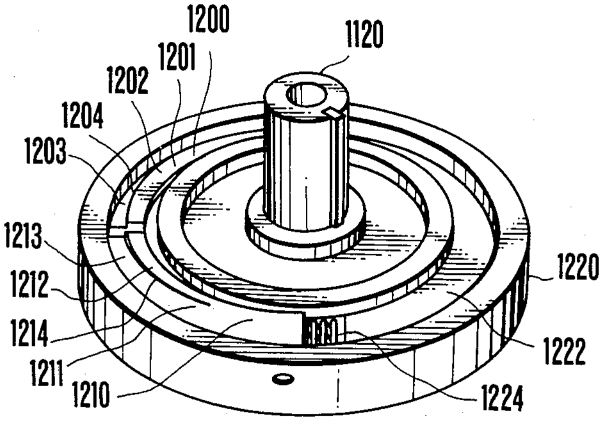
FIG. 35 is a perspective view showing mounting of a ratchet plate.
Figure 36:
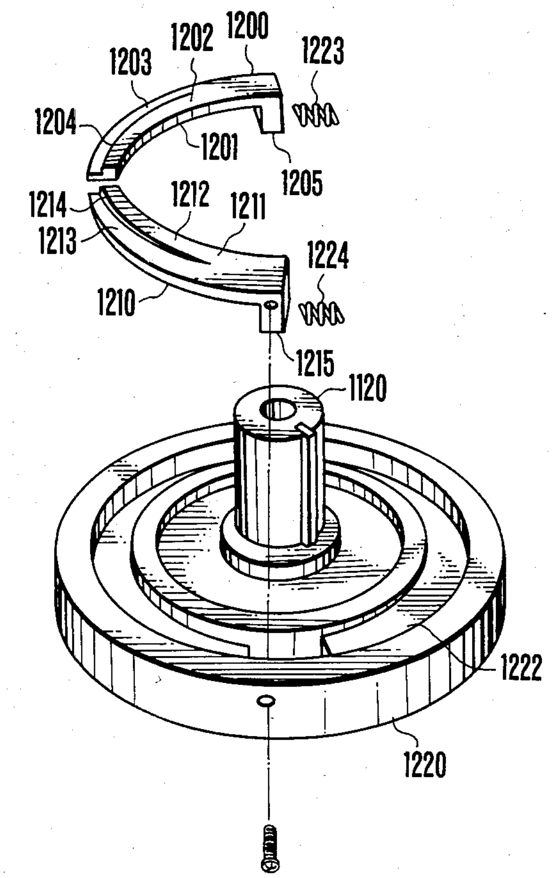
FIG. 36 is an exploded perspective view of the ratchet plate.

FIGS. 35 and 36 show a ratchet plate of a ratchet mechanism consisting of the ratchet members 1170 and 1180. Ratchet plates 1200 and 1210 have guides 1201 and 1211 each having a quadrantal shape. The guides 1201 and 1211 are mounted in an annular groove 1222 which has the center as the inclined shaft 1120 and which is formed in the lower surface of the disk member 1220. The ends of the guides 1201 and 1211 oppose each other. As shown in FIG. 36, hook-like proximal portions 1205 and 1215 of the ratchet plates 1200 and 1210 are supported by screws. Compression coil springs 1223 and 1224 are arranged in the recesse in the groove 1222 which are located at the proximal portions 1205 and 1215, respectively. The springs 1223 and 1224 urge the proximal portions 1205 and 1215 to always bias the guides 1201 and 1211 toward the clamp unit 1130 (upper direction in FIG. 36). The guides 1201 and 1211 of each of the ratchet plates 1200 and 1210 have high step surfaces 1202 and 1212 whose steps are increased from the proximal portions to the distal portions and low step surfaces 1203 and 1213. Pins 1174 and 1184 extending from the ratchet members slide along the high and low step surfaces.

The operation of the ratchet mechanism will be described with reference to FIGS. 37 to 48.

In the initial state, the clamp member 1150 is located at the side of the connector holding shelf 1119, and the clamp member 1160 is located at the side of the connector holding tool. The nipped connector is not clamped between the clamp members 1150 and 1160.

The ratchet member 1170 at the side of the clamp member 1150 is located at the end portion of the ratchet plate 1200. The ratchet member 1180 at the side of the clamp member 1160 opposes the ratchet member 1170 and is located in the groove 1222 of the disk member 1220. The lock pin 1154 of the movable pawl 1152 is locked by the step 1172 of the ratchet member 1170. The lock pin 1154 is positioned on the step 1172 where the biasing force of a spring 1148 for outwardly biasing the ratchet member 1170 around the pin 1171 is balanced with the biasing force of the compression coil spring 1146. The clamp member 1150 is kept open and faces the connector holding shelf 1119. When the connector CR is fed and reaches the connector holding shelf 1119 through the feed pipe S, a photosensor (not shown) arranged in the connector holding shelf 1119 detects the presence of the connector, and the actuator 1116 is started. The inclined shaft 1120 is rotated, and then the clamp unit 1130 is rotated (clockwise direction). The ratchet plate 1200 is moved downward by the compression coil spring 1223 at the side of the clamp unit 1130. When the clamp unit 1130 is rotated, the pin 1174 of the ratchet member 1170 is guided along a vertical ridge 1204 onto the low step surface 1203 of the guide 1201. In this manner, since the pin 1174 is guided by the vertical ridge 1204 onto the low step surface 1203, the ratchet member 1170 is pivoted couterclockwise. The lock pin 1154 stopped on the step 1172 is moved and locked on the step 1173 where the biasing force of the spring 1148 is balanced with the biasing force of the compression coil spring 1146. The clamp member 1150 is closed to clamp the connector CR. When the clamp unit 1130 is rotated (clockwise direction), the pin 1174 slides along the low step surface 1203, and the ratchet member 1170 is moved. The connector is removed from the connector holding shelf 1119 while the clamp member 1150 is closed (i.e., a state wherein the connector is being clamped). The clamp member 1150 is separated from the connector holding shelf 1119 and is turned toward the connector holding tool.

Figure 37:
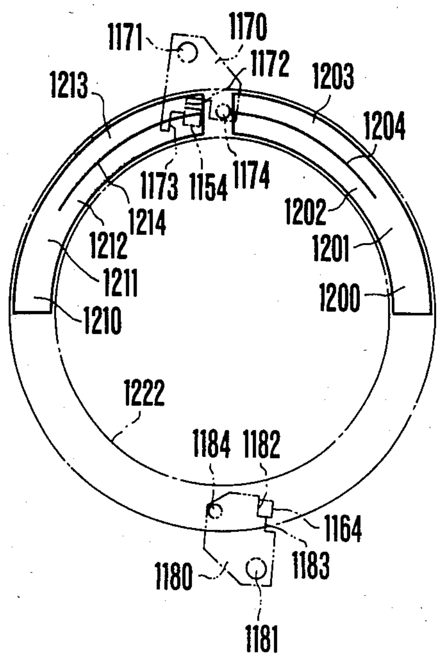
FIG. 37 is a plan view showing an initial state of a ratchet mechanism.
Figure 38:
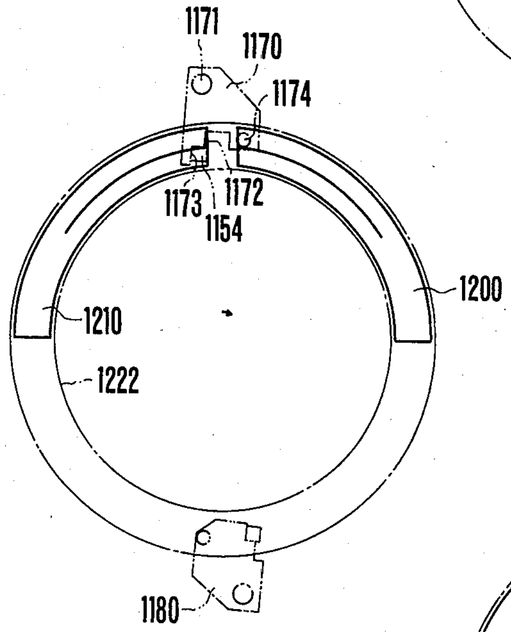
FIG. 38 is a plan view showing a state wherein the clamp unit clamps the nipped connector and is rotated.

In the ratchet member 1180 opposing the ratchet member 1170 and located in the groove 1222, the lock pin 1164 of the movable pawl 1162 is locked by the step 1182. The lock pin 1164 is positioned by the step 1182 such that the biasing force of the spring 1148 for biasing the ratchet member 1180 outward around the pin 1181 is balanced with the biasing force of the compression coil spring 1147. The clamp member 1160 is kept open (FIGS. 37 and 38).

Figure 39:
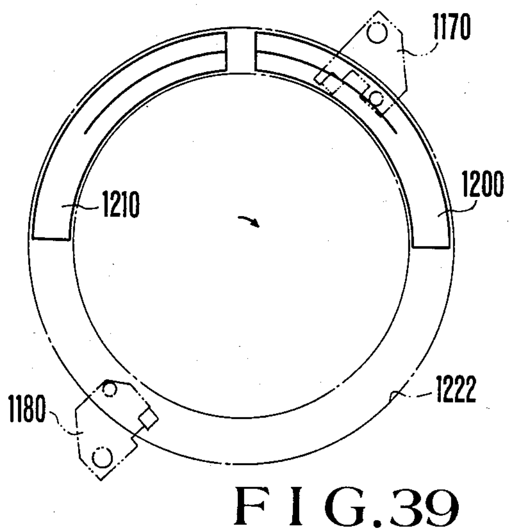
FIG. 39 is a plan view showing a state wherein the clamp unit is further rotated from the state of FIG. 38.
Figure 40:
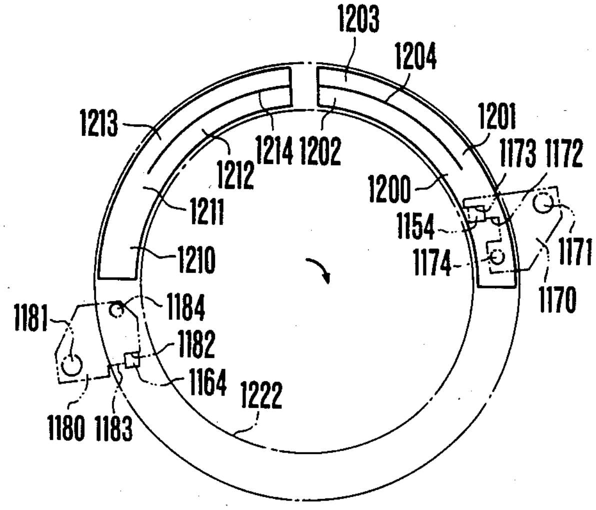
FIG. 40 is a plan view showing a state wherein the clamp unit is further rotated from the state of FIG. 39.

When the clamp unit 1130 is rotated and the ratchet member 1170 has reached near the proximal portion of the ratchet plate 1200, no step is formed in the guide 1201. The pin 1174 is moved along a line extending from the vertical ridge 1204 (FIGS. 39 and 40).

Figure 41:
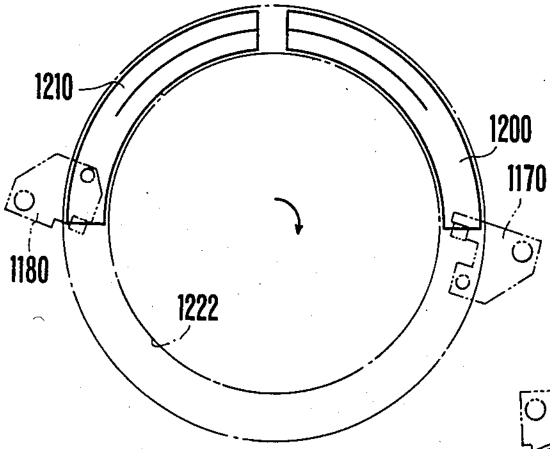
FIG. 41 is a plan view showing a state wherein the clamp unit is further rotated from the state of FIG. 40 and positions of the clamp members are reversed.
Figure 42:
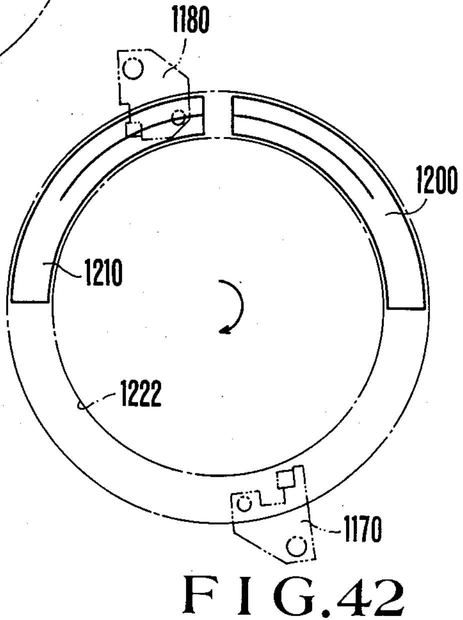
FIG. 42 is a plan view showing a state wherein the clamp unit is further rotated from the state of FIG. 41, and one clamp member comes closer to the connector holding tool.

When the ratchet member 1180 reaches the proximal portion of the ratchet plate 1210, the pin 1184 moves the ratchet plate 1210 upward (the ratchet plate 1210 is biased by the compression coil spring 1224 to its lower position at the side of the clamp unit 1130), so that the ratchet plate 1210 is moved along a vertical ridge 1214. In this case, the ratchet member 1180 is biased by the spring 1148, so that the pin 1184 will not be moved to the side of the low step surface 1213 (FIGS. 41 and 42).

Figure 30:
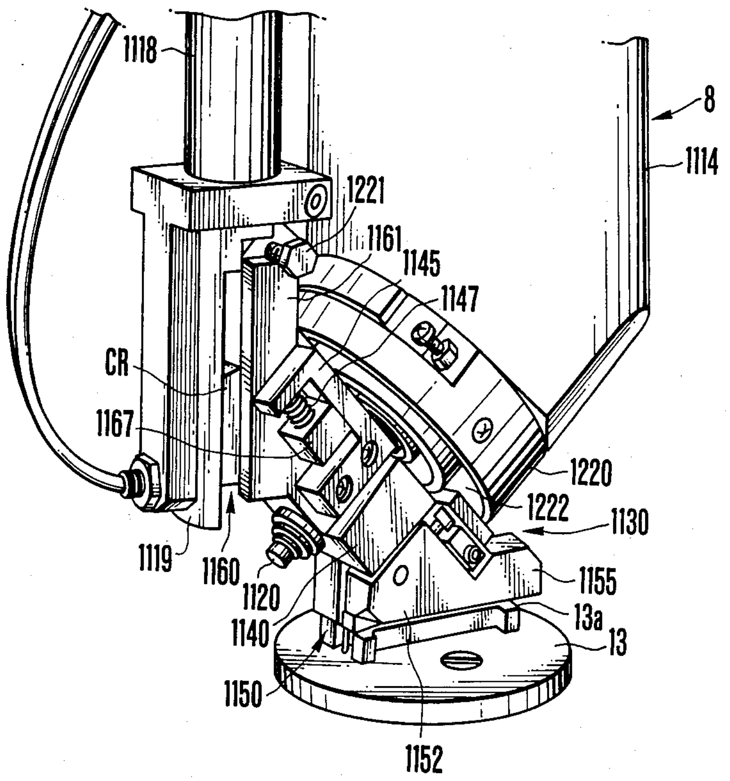
FIG. 30 is a perspective view showing mounting of the nipped connector.
Figure 43:
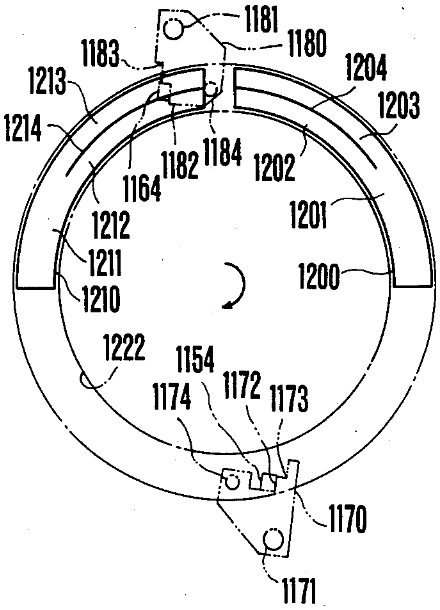
FIG. 43 is a plan view showing loading of the nipped connector.

When the actuator 1116 is rotated through 180°, the positioning member 1190 of the clamp unit 1130 abuts against the stopper 1221 and is stopped. At the same time, the limit actuator element 1233 actuates the limit switch 1234. A timing signal from the limit switch 1234 is supplied to the control device (FIG. 3), and the inclined shaft 1120 is stopped. In this case, the clamp member 1150 is not upright, so that the connector CR is maintained horizontal. The hand 10C for holding the base 1100 is moved downward, and the connector setting head 8 as a whole is moved downward. The connector CR is loaded in a connector holder 13*a* of the connector holding tool 13 (FIG. 30). The pawl piece 1155 of the movable pawl 1152 of the clamp member 1150 is brought into contact with the connector holder 13*a*. Since a rear surface 1156 of the pawl piece 1155 is tapered, the clamp member 1150 is opened. The lock pin 1154 is moved from the step 1173 of the ratchet member 1170 to the step 1172 and is positioned by the step 1172 where the biasing force of the spring 1148 is balanced with the biasing force of the compression coil spring 1146. As a result, the clamp member 1150 is opened (FIG. 43).

The main body 1110 and the upper structure 1230 are moved downward relative to the housing block 1114. When the cover member 1231 actuates the limit switch 1235, the limit switch 1235 generates a signal representing that the connector CR is firmly loaded. When loading of the connector CR is completed, the hand 10C is moved upward, and the connector setting head as a whole is moved upward.

When the connector setting head 8 is completely moved upward, the connector setting head 8 is moved by the hand 10C above the connector holding tool 13. In this case, the clamp member 1160 of the clamp unit 1130 is opened and faces the connector holding shelf 1119.

When the connector setting head 8 is located above the next connector holding tool 13, the connector CR is fed to the connector holding shelf 1119. The ratchet member 1180 is located at the end of the ratchet plate 1210. The pin 1184 is separated from the guide 1211. As described above, the clamp member 1160 kept in the open state receives the connector CR.

When the connector CR reaches the connector holding shelf 1119, the photosensor detects the presence of the connector CR. The actuator 1116 is rotated in the reverse direction, and the clamp unit 1130 is rotated counterclockwise. The ratchet plate 1210 is moved downward by the compression coil spring 1224 at the side of the clamp unit 1130. When the clamp unit 1130 is rotated, the pin 1184 of the ratchet member 1180 is guided to the low step surface 1213 of the guide 1211 along the vertical ridge 1214 in the same manner as in the ratchet member 1170. As described above, when the pin 1184 is guided to the low step surface 1213 along the vertical ridge 1214, the ratchet member 1180 is rotated couterclockwise. The lock pin 1164 locked with the step 1182 is moved to the step 1183 and stopped by the step 1183 where the biasing force of the spring 1148 is balanced with the biasing force of the compression coil spring 1147. The clamp member 1160 is closed to clamp the connector CR. Upon rotation of the clamp unit 1130, the pin 1184 is slid along the low step surface 1213. The ratchet member 1180 is moved to remove the connector CR from the connector holding shelf 1119 while the clamp member 1160 clamps the connector. The clamp member 1160 is then turned toward the connector holding tool.

Figure 44:
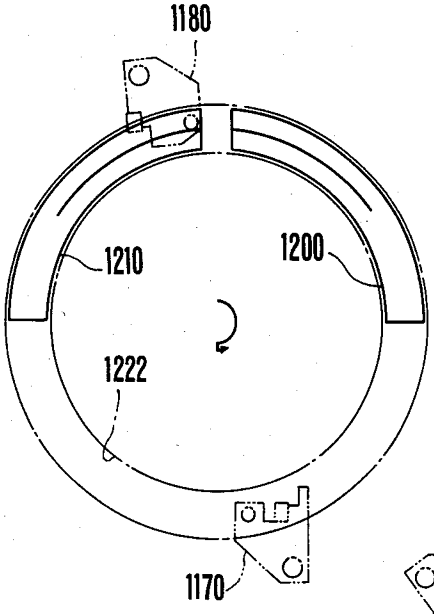
FIG. 44 is a plan view showing a state wherein the clamp unit is inverted.
Figure 45:
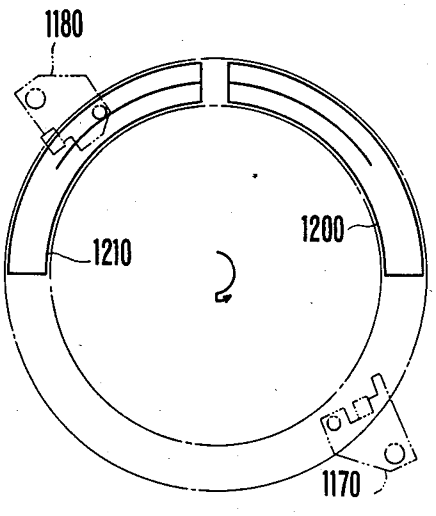
FIG. 45 is a plan view showing a state wherein the clamp unit is further rotated from the state of FIG. 44.

Since the groove 1222 is formed in the ratchet member 1170, the lock pin 1154 is located on the step 1172, and the clamp member 1150 is kept opened (FIGS. 44 and 45).

Figure 46:
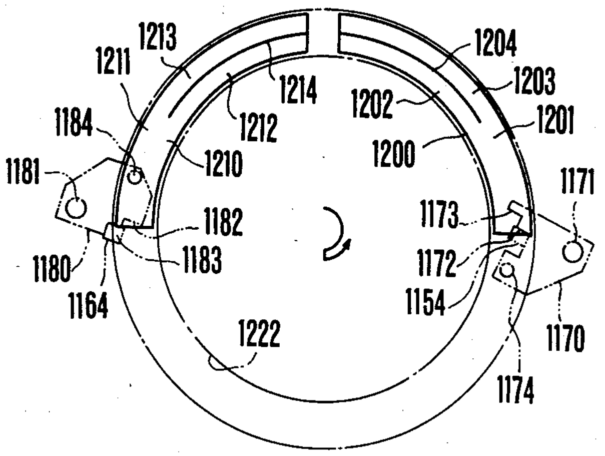
FIG. 46 is a plan view showing a state wherein the clamp unit is further rotated from the state of FIG. 45.
Figure 47:
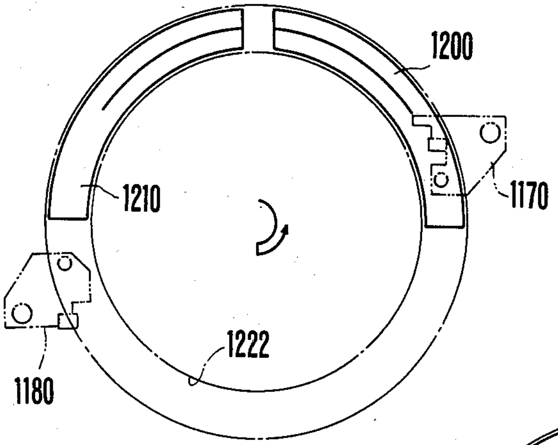
FIG. 47 is a plan view showing a state wherein the clamp unit is further rotated from the state of FIG. 46 and the positions of the clamp members are reversed.

When the clamp unit 1130 is further rotated and the ratchet member 1180 reaches near the proximal portion of the ratchet plate 1210, no step is formed in the guide 1211. The pin 1184 is moved along a line extending from the vertical ridge 1214 (FIGS. 46 and 47).

Figure 48:
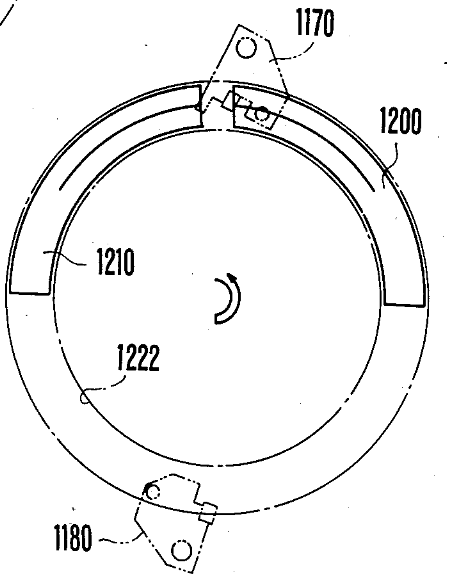
FIG. 48 is a plan view showing a state wherein the clamp unit is further rotated from the state of FIG. 47 and the other clamp member comes closer to the connector holding tool.

When the ratchet member 1170 reaches the proximal portion of the ratchet plate 1200, the pin 1174 urges the ratchet plate 1200 upward (the ratchet plate 1200 is biased by the compression coil spring 1223 to its lower position at the side of the clamp unit), so that the ratchet plate 1200 is moved along the vertical ridge 1204 of the guide 1201. In this case, the ratchet member 1170 is biased by the spring 1148 and will not be moved to the side of the low step surface 1203 (FIG. 48).

When the actuator 1116 is rotated through 180°, the clamp unit 1130 and the positioning member 1190 abut against the stopper 1221 and are stopped. At the same time, as described above, the limit actuator element 1233 actuates the limit switch 1234. A timing signal is supplied to the control device (FIG. 3), and the inclined shaft 1120 is stopped. In this case, the clamp member 1160 is not upright, and the connector is maintained horizontally. The robot hand 10C for holding the base 1100 is moved downward, and the connector setting head 8 as a whole is moved downward. The connector CR is loaded in the connector holder 13*a* of the connector holding tool 13. In the same manner as described above, the pawl piece 1165 of the movable,pawl 1162 of the clamp member 1160 is brought into contact with the connector holder 13*a*. Since the bottom surface 1166 of the pawl piece 1165 is tapered, the clamp member 1160 is opened. The lock pin 1164 is moved from the step 1183 of the ratchet member 1180 to the step 182 and is stopped by the step 1182 where the biasing force of the spring 1148 is balanced with the biasing force of the compression coil spring. The clamp member 1160 is opened.

The main body 1110 and the upper structure 1230 are moved downward relative to the housing block 1114. When the cover member 1231 actuates the limit switch 1235, the limit switch 1235 generates a signal representing that the connector CR is firmly loaded. When the connector is mounted, the hand 10C is moved upward, and the connector setting head 8 as a whole is moved upward. When the connector setting head 8 is completely moved upward, the same operation as described above will be repeated. The connectors CR are sequentially loaded in the connector holding tools 13, respectively.

According to the present invention as described above, connector loading, wire patterning, and wire binding of the wire harness with nipped connectors can be automatically performed by using the connector setting head, the wiring/nipping head and the binding head which are selectively held by the robot hand without manual operations. When on clamp member is waiting for clamping the connector, the other clamp member can load the connector in the connector holding tool. By repeating normal and reverse rotations of the inclined shaft, the connectors are sequentially loaded, thereby obtaining an apparatus for manufacturing a wire harness with nipped connectors wherein the loading efficiency of the connectors is improved and the mechanism drive loss can be decreased. As a result, the wire harness with nipped connectors can be easily manufactured at low cost, resulting in practical advantages.

The present invention is not limited to the particular embodiment described above. Various changes and modifications may be made within the spirit and scope of the invention. For example, the robot as the control unit is not limited to a polar coordinate type robot. It is essential to cause the robot hand to perform $\theta$-, R- and Z-axis movements under the control of the computer.

What is claimed is:

1. An apparatus for manufacturing a wire harness by using a nipped connector, characterized in that said apparatus comprises:

a work table having an arcuate shape which is horizontally placed on a base and which moves in up and down directions, said work table having a plurality of connector holding tools and wiring-/nipping tools disposed in a predetermined pattern;

a robot having a hand which moves in back-and-forth, vertical and horizontal directions, said robot being disposed substantially in the center of said work table and movable within a certain operational range;

a connector setting head means for setting a plurality of nipped connectors in said connector holding tools on said work table;

a wiring/nipping head means for performing wiring between said nipped connectors;

a connector supply source means for supplying said nipped connectors to said connector setting head;

a wire supply source means for supplying wires to said wiring/nipping head;

a binding head means for binding said wire harness arranged on said work table by a binding material pulled form a binding material supply source, said connector setting head means, wiring/nipping head means and binding head means being disposed in said operational range of the robot hand;

a control device means for sequentially controlling the operation of said tools on said work table, up and down operations of said work table, the operation of said connector setting head means, said wiring/nipping head means, said binding head means, and said connector supply source means, to manufacture said wire harness with a desired pattern;

said wiring/nipping means, said connector setting head means, and said binding head means being selectively picked up by said hand so that they are movably actuated under control of said control device within the operational range of said hand.

2. An apparatus according to claim 1, wherein said wiring/nipping tools has at least one hook pin at a position outside a path of said wiring/nipping head.

3. An apparatus according to claim 1, wherein each of said wiring/nipping tools has four hook pins arranged at positions outside a path of said wiring/nipping head to extend along directions substantially perpendicular to said work table.

4. An apparatus according to claim 1, wherein each of said wiring/nipping tools has four hook pins arranged at positions outside a path of said wiring/nipping head and wherein said hook pins are inclined toward a central axis of said wiring/nipping tool.

5. An apparatus according to claim 1, wherein said connector setting head comprises: a holding member for holding the connector fed from said connector supply source; and pawls which can be pivoted at an angle of about 45° with respect to an inclined shaft so as to load the connector from said holding member to a given connector holding tool.

6. An apparatus according to claim 5, wherein said pawls comprise: a fixed pawl fixed on said inclined shaft; a movable pawl which opposes said fixed pawl and which is pivotally mounted on said inclined shaft; and a spring for biasing said movable pawl.

7. An apparatus according to claim 6, wherein said apparatus further includes a stopper mechanism for separating said movable pawl from said fixed pawl when said pawls clamp the connector.

8. An apparatus according to claim 1, wherein said hand comprises parallel supports for selectively supporting said connector setting head and said wiring/nipping head, said hand being provided with a gear for driving a head movable member.

9. An apparatus according to claim 8, wherein a gear of said connector setting and said wiring/nipping head is meshed with said gear of said hand and has a lock mechanism for preventing said connector setting and said wiring/nipping head from being rotated when said head is not properly inserted in said parallel supports.

10. An apparatus according to claim 1, wherein said wiring/nipping head has nipping projections and wire guides which are aligned on a bottom surface thereof and a cutter arranged near said nipping projections to cut an unnecessary portion of the wire.

11. An apparatus according to claim 10, wherein said cutter grips said wire thereby clamping said wire while cutting said portion of said wire.

12. An apparatus according to claim 10, wherein said apparatus further includes a mechanism for vibrating the wire.

13. An apparatus according to claim 1, wherein said wiring/nipping head comprises: front and rear block members each of which has a nipping projection and a guide on a lower surface thereof; and a cutter having a cutting function and a clamping function and disposed between said front and rear block members, said cutter having blades facing so as to interpose said nipping projections therebetween.

14. An apparatus according to claim 1, wherein said connector supply source comprises first and second lock pins disposed midway along a connector feed path and alternately projecting in the connector feed path, a distance between said first and second lock pins being determined in accordance with a length of the connector.

15. An apparatus according to claim 14, wherein said first lock pin is mounted on an operation plate through an adjusting mechanism movable along the connector feed path, said operation plate being normally biased by a spring such that said first lock pin is withdrawn from the connector feed path, said first lock pin being moved extending in the connector feed path when the connector is fed, and said second lock pin being mounted on a mechanism such that said second lock pin normally extends in the connector feed path from a side opposite to said first lock pin, but is removed from the connector feed path in association with movement of said operation plate when the connector is fed.

16. An apparatus according to claim 1, wherein said apparatus further comprises a plurality of connector cases for storing connectors in an oblique manner and a pair of holding plates located opposite to a lowermost one of said connector cases, said pair of holding plates being normally located close each other, said pair of holding plates having notches at sides thereof which are located opposite to each other to form a hole so as to cause the connector stored in said lowermost connector case to drop into the connector feed path, a lower end of each of said pair of holding plates being provided with a lock pole for preventing said lowermost connector case from being dropped along an oblique direction while said pair of holding plates are located close each other.

17. An apparatus according to claim 16, wherein said pair of holding plates are opened in a right-and-left direction in synchronism with a locking mechanism for preventing a second lowest connector case from sliding along the oblique direction when said pair of holding plates detect that no connector is present along the connector feed path.

18. An apparatus according to claim 17, wherein said locking mechanism comprises: a spindle with a columnar portion and a conical portion extending continuously downward from said columnar portion; and means for causing said spindle extending between said pair of holding plates to move toward a direction of a second lowest connector case.

19. An apparatus according to claim 1, wherein said connector supply source comprises a plurality of rows of connector cases stacked along an inclined surface, and a transfer unit is arranged in front of a magazine to be movable along an alignment direction of said rows so as to sequentially supply each connector from a lowermost one of said connector cases to said connector setting head.

20. An apparatus according to claim 1, wherein said connector setting head comprises a holding unit for holding the connector and a plurality of pawls pivotal about an inclined shaft inclined by an angle of 45° so as to sequentially load the connector received from said holding unit to a given one of the connector holding tools.

21. An apparatus for manufacturing a wire harness by using a nipped connector, characterized in that said apparatus comprises: a work table having a plurality of connector holding tools and wiring/nipping tools thereon in a predetermined pattern; a robot having a hand which is moved in back-and-forth, vertical and horizontal directions; a connector setting head that is selectively picked up by said hand for setting a plurality of nipped connectors in said connector holding tools on said work table; a wiring/nipping head which is selectively held by said hand so as to perform wiring between said nipped connectors; a connector supply source for supplying said nipped connectors to said connector setting head; a wire supply source for supplying wires to said wiring/nipping head; and a control device for sequentially controlling said work table, said robot, said connector setting head, said wiring/nipping head, said connector supply source and said wire supply source; wherein said work table includes a fixed plate, a movable plate which is vertically movable relative to said fixed plate and which has holes having a pattern corresponding to a pattern of said connector holding and wiring/nipping tools, and wherein said connector holding and wiring/nipping tools are mounted on said fixed plate through said holes of said movable plate.

22. An apparatus according to claim 21, wherein said fixed plate comprises a magnetic member, and permanent magnets are respectively provided at lower ends of said connector holding and wiring/nipping tools, respectively.

23. An apparatus according to claim 21, wherein said connector holding and wiring/nipping tools respectively comprise delivery plates on upper surfaces thereof, said delivery plates having a shape corresponding to the pattern of said holes of said movable plate and being respectively coupled to said tool bodies of said connector holding and wiring/nipping tools through springs for biasing to attract said tool bodies.

24. An apparatus according to claim 23, wherein each of said connector holding and wiring/nipping tools comprises a fixed plate opposing a lower end face thereof and locking means for specifying a mounting direction of said tool body with respect to said fixed plate.

25. An apparatus for manufacturing a wire harness by using a nipped connector, characterized in that said apparatus comprises: a work table having a plurality of connector holding tools and wiring/nipping tools thereon in a predetermined pattern; a robot having a hand which is moved in back-and-forth, vertical and horizontal directions; a connector setting head that is selectively picked up by said hand for setting a plurality of nipped connectors in said connector holding tools on said work table; a wiring/nipping head which is selectively held by said hand so as to perform wiring between said nipped connectors; a connector supply source for supplying said nipped connectors to said connector setting head; a wire supply source for supplying wires to said wiring/nipping head; and a control device for sequentially controlling said work table, said robot, said connector setting head, said wiring/nipping head, said connector supply source and said wire supply source wherein each of said connector holding tools comprise a pair of connector holders spaced by a predetermined distance from each other so as to cause a tool body to clamp the connector; an insulating member disposed between said pair of connector holders and having a plurality of connector holding pins to be engaged with said connector; and a conductive rubber member disposed below said insulating member near lower ends of said connector holding pins, said conductive rubber member being conductive to electrically connect a given one of said connector holding pins and said tool body by a force acting on said given connector holding pin when the wire is nipped in a terminal of the connector.

* * * * *

UNITED STATES PATENT AND TRADEMARK OFFICE
CERTIFICATE OF CORRECTION

PATENT NO. : 4,742,612

DATED : 5/10/88

INVENTOR(S) : Kenjiro Dokan et al.

It is certified that error appears in the above-identified patent and that said Letters Patent is hereby corrected as shown below:

| COLUMN | LINE | DESCRIPTION |
|---|---|---|
| 18 | 35 | delete "syste" insert --system-- |
| 25 | 12 | delete "182" insert --1182-- |

Signed and Sealed this

Sixth Day of December, 1988

*Attest:*

DONALD J. QUIGG

*Attesting Officer*

*Commissioner of Patents and Trademarks*